(12) United States Patent
Franche et al.

(10) Patent No.: US 9,247,264 B2
(45) Date of Patent: Jan. 26, 2016

(54) METHOD AND SYSTEM FOR PARALLEL ENCODING OF A VIDEO

(75) Inventors: Jean-Francois Franche, Montreal (CA); Stephane Coulombe, Brossard (CA)

(73) Assignee: ECOLE DE TECHNOLOGIE SUPERIEURE, Montreal (CA)

( * ) Notice: Subject to any disclaimer, the term of this patent is extended or adjusted under 35 U.S.C. 154(b) by 1044 days.

(21) Appl. No.: 13/309,298

(22) Filed: Dec. 1, 2011

(65) Prior Publication Data

US 2012/0140816 A1 Jun. 7, 2012

(30) Foreign Application Priority Data

Dec. 1, 2010 (CA) .................................. 2722993

(51) Int. Cl.
| | |
|---|---|
| H04N 7/26 | (2006.01) |
| H04N 19/436 | (2014.01) |
| H04N 19/52 | (2014.01) |
| H04N 19/172 | (2014.01) |
| H04N 19/61 | (2014.01) |
| H04N 19/174 | (2014.01) |
| H04N 19/43 | (2014.01) |

(52) U.S. Cl.
CPC ........... *H04N 19/436* (2014.11); *H04N 19/172* (2014.11); *H04N 19/174* (2014.11); *H04N 19/43* (2014.11); *H04N 19/52* (2014.11); *H04N 19/61* (2014.11)

(58) Field of Classification Search
CPC .......................... H04N 19/00272; H04N 19/61
USPC ........................ 375/240.03, 240.13
See application file for complete search history.

(56) References Cited

U.S. PATENT DOCUMENTS

| | | | | |
|---|---|---|---|---|
| 6,963,608 | B1 * | 11/2005 | Wu ......................... | 375/240.03 |
| 7,630,565 | B2 * | 12/2009 | Linzer ........................ | 382/234 |
| 8,279,942 | B2 * | 10/2012 | Ito ........................ | H04N 19/61 375/240.24 |
| 8,520,730 | B2 * | 8/2013 | Kadono ................ | H04N 19/61 375/240.13 |
| 8,542,748 | B2 * | 9/2013 | Zhao et al. ............... | 375/240.26 |
| 8,737,475 | B2 * | 5/2014 | Yan et al. ................. | 375/240.16 |
| 8,964,830 | B2 * | 2/2015 | Perlman et al. .......... | 375/240.01 |

(Continued)

OTHER PUBLICATIONS

A Multi-Frame and Multi-Slice H.264 Parallel Video Encoding Approcach with Simultaneous Encoding of Prediction Frames (Jean-Francois Franche, Stéphane Coulombe), 2012.*

(Continued)

*Primary Examiner* — William C Vaughn, Jr.
*Assistant Examiner* — Luis Perez Fuentes
(74) *Attorney, Agent, or Firm* — IP-MEX Inc.; Victoria Donnelly

(57) ABSTRACT

A method and system for parallel encoding of frames in a video are described, exploiting parallel processing at both frame and slice levels. One or more slices are processed in a preceding frame by one or more cores in a multi-core processor, and a slice is processed in a succeeding frame provided at least one of said one or more cores in the multi-core processor is available for processing; and the processing of a slice from said one or more slices at same physical location in the preceding input frame has been completed, the processing of frames and slices in the preceding and succeeding frames being performed at least partially in parallel. A significant speedup in comparison to the sequential encoding approach is achieved while maintaining high visual quality for the output video. A corresponding system for parallel encoding of a video is also provided.

25 Claims, 15 Drawing Sheets

(56) References Cited

U.S. PATENT DOCUMENTS

2008/0152014 A1* 6/2008 Schreier ............... H04N 19/172
 375/240.21
2010/0020877 A1* 1/2010 Au ........................ H04N 19/52
 375/240.16

OTHER PUBLICATIONS

H.264 ITU-T Telecommunication and Standardization Sector of ITU Advanced Video Coding for Generic Audiovisual Services, Mar. 2009.

Intel (2010 Intel Integrated Performance Primitives 6.1—Code Samples Available: http://software.intel.com/en-us/articles/intel-integrated-performance-primitives-code-samples/.

Chien, S. et al. "Hardware Architecture Design of Video Compression for Multimedia Communication Systems" IEEE Communications Magazine, vol. 43, p. 123, 2005.

Changying, L. et al., "The Research of H.264/AVC Video Encoding Parallel Algorithm," in Intelligent Information Technology Application, 2008. IITA '08. Second International Symposium on, 2008, pp. 201-205.

Rodriguez, A. et al., "Hierarchical Parallelization of an H.264/AVC Video Encoder," in Parallel Computing in Electrical Engineering, 2006. PAR ELEC 2006. International Symposium on, 2006, pp. 363-368.

Shu-Wei, S. and Shu-Ming, C., "An Efficient Parallel Algorithm for H. 264/AVC Encoder [J]," Acta Electronica Sinica, vol. 2, 2009.

Zrida, H. K. et al., "High level H. 264/AVC video encoder parallelization for multiprocessor implementation," 2009, pp. 940-945.

Chen, Y. et al., "Implementation of H. 264 encoder and decoder on personal computers," Journal of Visual Communication and Image Representation, vol. 17, pp. 509-532, 2006.

Ge, S. et al., "Efficient multithreading implementation of H.264 encoder on Intel hyper-threading architectures," in Information, Communications and Signal Processing, 2003 and the Fourth Pacific Rim Conference on Multimedia. Proceedings of the 2003 Joint Conference of the Fourth International Conference on, 2003, pp. 469-473 vol. 1.

(2010) Xiph.org. Test Media. [Online]. Available: http://media.xiph.org/video/derf/.

H.263 http://en.wikipedia.org/w/index.php?title=H.263&oldid=386693910 Sep. 24, 2010.

Tudor P.N. MPEG-2 Video Compression, Electronics & Communication Engineering Journal, Dec. 1995.

MPEG-4 Part 2 http://en.wikipedia.org/w/index.php?title=MPEG-4_Part_2&oldid=3862 . . . Sep. 22, 2010.

H.264/MPEG-4 Part 10 (AVC) http://en.wikipedia.org/w/index.php?title=H.264/MPEG-4_AVC&oldid=. . . Nov. 22, 2010.

VC-1 http://en.wikipedia.org/w/index.php?title=VC-1&oldid=395587655 Nov. 8, 2010.

Peng, Q. and Zhao, Y. "Study on Parallel Approach in H.26L Video Encoder" School of Computer and Communications Engineering, Southwest Jiaotong University, Chengdu, China IEEE, 2003.

Overview of MPEG-4 Standard ISO/IEC JTC1/SC29NVg11 N 4668, Mar. 2002.

* cited by examiner

| (Slice $S_0$) 341 | (Slice $S_0$) 345 |
| (Slice $S_1$) 342 | Thread 2 (*Slice $S_1$*) 346 |
| (Slice $S_2$) 343 | Thread 3 (*Slice $S_2$*) 347 |
| Thread 1 (*Slice $S_3$*) 344 | (Slice $S_3$) 348 |
| Frame $F_n$ | Frame $F_{n+1}$ |

*Figure 3(a)*

| (Slice $S_0$) 351 | (Slice $S_0$) 355 |
| Thread1 (*Slice $S_1$*) 352 | (Slice $S_1$) 356 |
| (Slice $S_2$) 353 | (Slice $S_2$) 357 |
| Thread 2 (*Slice $S_3$*) 354 | (Slice $S_3$) 358 |
| Frame $F_n$ | Frame $F_{n+1}$ |

*Figure 3(b)*

| Bit rate (Mbit/s) | MSW mode | | SSW mode | |
| --- | --- | --- | --- | --- |
| | Speedup | Quality loss (dB) | Speedup | Quality loss (dB) |
| 1 | 6.52x | 0.84 | 7.07x | 2.64 |
| 5 | 7.06x | 0.32 | 7.77x | 2.16 |
| 10 | 7.2x | 0.22 | 7.95x | 1.85 |
| 15 | 7.33x | 0.18 | 7.92x | 1.67 |
| 20 | 7.35x | 0.16 | 7.99x | 1.54 |

| Sequence | MSW mode | | SSW mode | |
| --- | --- | --- | --- | --- |
| | Speedup | Quality loss (dB) | Speedup | Quality loss (dB) |
| Horse-cab | 7.36x | 0.23 | 8.15x | 3.23 |
| Rally | 6.43x | 0.46 | 6.94x | 1.6 |
| Sunflower | 7.45x | 0.06 | 8.58x | 1.62 |
| Tractor | 7.45x | 0.012 | 8.15x | 1.39 |
| Train-station | 7.52x | 0.06 | 8.4x | 1.9 |
| Waterskiing | 6.98x | 0.39 | 7.45x | 1.36 |
| Average | 7.2x | 0.22 | 7.95x | 1.85 |

METHOD AND SYSTEM FOR PARALLEL ENCODING OF A VIDEO

RELATED APPLICATIONS

The present invention claims benefit from the Canadian patent application serial number 2,722,993 filed on Dec. 1, 2010 for "A MULTIFRAMES AND MULTISLICES PARALLEL VIDEO ENCODING SYSTEM WITH SIMULTANEOUS ENCODING OF PREDICTED FRAMES", entire contents of which are incorporated herein by reference.

FIELD OF THE INVENTION

The invention relates to the field of video encoding, and in particular, to an efficient method and system for parallel encoding of frames contained in a video.

BACKGROUND OF THE INVENTION

The continuous increase in the speed of available networks and the use of effective wireless technology is making it possible to provide rich content including both audio and video to a different variety of end devices that include mobile terminals, cell phones, computers and other electronic devices. In order to maintain its competitive advantage, a service provider needs to maintain video quality and reliability as well as be able to process high volume of traffic in a timely manner. Video encoding, an important step in the process, is notoriously CPU time consuming. Effective techniques for high speed encoding of video is thus necessary for meeting the objectives of the service provider.

Video compression is an important step in the encoding of video images. H.264 is the most recent and efficient standard for video compression described in "Advanced Video Coding (AVC) for generic audiovisual services", ed, March 2009, and ITU-T Rec, H.264. The new tools introduced by this standard improve on the compression ratio of its predecessors by a factor of two, but at the cost of higher complexity. H.264 is also one of most commonly used formats in processing high definition (HD) videos. However, this standard is so complex that some video encoders face difficulties encoding HD video sequences in real-time, even on current state of the art processors.

To reduce the encoding time, most H.264 video encoders developed for general processors exploit parallel approaches. For example, as part of Intel. 2010, *Intel® Integrated Performance Primitives* 6.1—code Samples available from http://software.intel.com/en-us/articles/intel-integrated-performance-primitives-code-samples/, Intel's IPP H.264 video encoder is based on a multi-slice parallel approach, where the slices of a frame are encoded in parallel. The multi-core era does offer the promise of a great future for well-designed parallel approaches. A parallel approach must achieve speed-ups close to the number of cores used, support a variable number of cores with high scalability, reduce processing latency, preserve visual quality video without giving rise to significant degradation in the quality of the encoded video, and should not change or force encoding parameters.

Existing prior art addressing the parallelization of H.264 encoders is briefly described below. An H.264 encoder can be parallelized into multiple threads by using either functional decomposition or data domain decomposition. Functional decomposition divides an encoder into multiple tasks (motion estimation, transformation, entropy coding, etc.). Tasks are grouped in balanced processing groups, and each group is associated with a thread. As discussed by S. Chien, et al., in "Hardware architecture design of video compression for multimedia communication systems", *IEEE Communications Magazine*, vol. 43, p. 123, 2005, this type of decomposition can deliver good speedup, but rarely allows good scalability and flexibility to change.

Data domain decomposition exploits the H.264 hierarchical structure to parallelize an encoder. This hierarchical structure has six levels: sequence, groups of pictures (GOPs), pictures, slices, macroblocks (MBs) and blocks. Each GOP starts with an instantaneous decoder refresh (IDR) frame. Frames following an IDR frame may not refer to frames preceding the IDR frame, meaning that GOPs are independent of each other, and can be encoded in parallel. Each frame belongs to one of the following types: intra (I) frames, predicted (P) frames or bidirectional (B) frames. I frames are coded without reference to any other frame, while P frames are coded with reference to a past frame, and B frames are commonly coded with reference to a past and a future frame. Although a B frame may be used as reference, this is rarely the case in practice. Therefore, it is safe to assume that no frame depends on a B frame. A slice represents a spatial region of a coded frame. A slice represents all or part of a coded video frame and includes a number of coded macroblocks (MB), each containing compressed data corresponding to a 16×16 block of displayed pixels in a video frame. In general, the macroblocks are situated at predetermined positions in the frame. On many systems each slice comprises one or more MB lines, wherein each MB line comprises consecutive MBs in the entire row of a frame. Similar to frames, there are three types of slices: I slices, P slices and B Slices. Slices belonging to the same frame are also independent of one another, and can therefore be encoded in parallel. Slices comprise macroblocks. A macroblock covers an area of 16×16 luminance pixels (top-left, top and top-right) and the one on its left (left neighbor). Processing of a P or B macroblock is dependent on its top neighbor, top-right neighbor and left neighbor.

Changying et al. describe a parallel algorithm at the GOP level for the H.264 in "The Research of H.264/AVC Video Encoding Parallel Algorithm", *Intelligent Information Technology Application*, 2008. IITA '08. Second International Symposium, 2008, pp. 201-205. The authors use a Master-Worker model and a dynamic scheduling algorithm to distribute the next GOP unit to process to an unused node, and obtain good scalability and speedup. However, this pure GOP-level parallel approach exhibits high latency, and is therefore not applicable to real-time encoding. Rodriguez et al., propose an approach based on GOP and slice level parallelism in Hierarchical Parallelization of an H.264/AVC Video Encoder, *Parallel Computing in Electrical Engineering*, 2006, *PAR ELEC* 2006, International Symposium, 2006, pp. 363-368. In this approach, the system is composed of homogeneous clusters of workstations. Each cluster receives a GOP unit to process dynamically. A master workstation divides each frame into slices and distributes their processing among workstations. While this approach provides a good trade-off between speedup and latency, this type of encoding can however only be used when the system has access to all the frames of the video sequence to compress, making it unacceptable for real-time telecommunications.

Chen et al. present a parallel approach at the macroblock level in "Implementation of H.264 encoder and decoder on personal computers", *Journal of Visual Communication and Image Representation*, vol. 17, pp. 509-532, 2006. This algorithm exploits dependencies between macroblocks in a wave front manner. This kind of approach produce's a good, but not excellent, speedup. Ge et al., describe a more efficient approach based on a frame-level and slice-level parallelism in "Efficient multithreading Implementation of H.264 encoder on Intel hyper-threading architectures", *Information, Communications and Signal Processing and the Fourth Pacific Rim Conference on Multimedia, Proceedings of the* 2003, Vol. 1, pp. 469-473. This approach uses five threads on a system with four processors. One thread is used to load the input file (or stream), to save the output file (or stream) and to fill two lists of slices: a priority list of I and P slices and a secondary list of B slices. The other four threads are used to encode slices in parallel. Each thread retrieves and processes the next free slice in the priority list. If this list is empty, the thread retrieves the next free slice in the secondary list. This approach provides excellent speedup, but forces the use of B frames, which is not always possible (for example, the H.264 baseline profile does not allow B frames) and also increases latency. Low latency is required however, in real-time video applications such as videoconferencing.

Therefore, there is a strong requirement for developing a method and system for parallel encoding of video that would be able to handle commonly used video compression standards and profiles and produce high speedup leading to a low latency which is important for many real time applications.

SUMMARY OF THE INVENTION

Therefore it is an object of the present invention to provide an improved method and system for parallel encoding of video that would avoid or mitigate the limitations of the prior art.

According to one aspect of the invention, there is provided a method for encoding a video, comprising: (a) encoding two successive input frames of the video, a preceding input frame and a succeeding input frame, comprising: (a1) dividing the preceding input frame into slices, each slice characterizing a spatial region within the preceding input frame; (a2) dividing the succeeding input frame into slices, each slice characterizing a spatial region within the succeeding input frame; (a3) processing one or more slices in the preceding input frame by one or more cores in a multi-core processor or by one or more hardware processors; (a4) processing a slice in the succeeding input frame provided: (i) at least one of said one or more cores in the multi-core processor or said one or more hardware processors is available for processing; and (ii) the processing of a slice from said one or more slices at same physical location in the preceding input frame has been completed; wherein the steps (a3) and (a4) are performed at least partially in parallel.

In the method, the preceding input frame and the succeeding input frame is one of the intra frame and predicted frame. Beneficially, the preceding input frame and the succeeding input frame are predicted frames. In the method described above, two or more steps (a1)-(a4) are performed at least partially in parallel.

The method further comprises performing the step (a4) immediately upon the condition (ii) is met. The method further comprises performing motion estimation for the slice in the succeeding input frame using said slice from said one or more slices at same physical location in the preceding input frame. The method further comprises: selecting a motion estimation window containing said one or more slices; and performing the step (a4) provided: (iii) the processing of said one or more slices contained within the motion estimation window has been completed, the motion estimation window also containing said slice at the same physical location in the preceding frame. The method further comprises performing a motion estimation for the slice in the succeeding input frame using said one or more slices contained within the motion estimation window.

In the method described above, said one or more slices within the motion estimation comprise one of the following: at least one of the slices on top and at bottom of said slice at the same physical location in the preceding input frame; both a slice on top and a slice at bottom of said slice at the same physical location in the preceding input frame; more than one slice above said slice at the same physical location in the preceding input frame; more than one slice below said slice at the same physical location in the preceding input frame; and all slices within the motion estimation window.

The method further comprises performing a motion estimation for the slice in the succeeding input frame using: said slice at the same physical location in the preceding input frame; and one of the following: at least one of the slices on top and at bottom of said slice at the same physical location in the preceding input frame; both a slice on top and a slice at bottom of said slice at the same physical location in the preceding input frame; more than one slice above said slice at the same physical location in the preceding input frame; more than one slice below said slice at the same physical location in the preceding input frame; and all other slices within the motion estimation window.

The method further comprises, for each input frame, generating a corresponding output frame comprising processed slices; and writing the output frames in an output video.

In the method of the embodiments of the invention, a sum of a number of slices in the preceding input frame and a number of slices in the succeeding input frame is equal to or greater than a number of said one or more cores or said one or more hardware processors.

In the method described above, the step (a3) further comprises performing a pre-slice encoding of the preceding input frame before processing said one or more slices in the preceding input frame, comprising writing a frame type and a frame header into a respective output frame; and the step (a4) further comprises performing a pre-slice encoding of the succeeding input frame before processing the slice in the succeeding input frame, comprising writing a frame type and a frame header into a respective output frame; the pre-slice encoding of the succeeding input frame being performed after the pre-slice encoding of the preceding input frame is completed.

In the method described above, the step (a3) further comprises performing a post-slice encoding of the preceding input frame after processing all slices in the preceding input frame, comprising applying a deblocking filter for smoothing sharp edges formed between macroblocks of the preceding input frame; and the step (a4) further comprises performing a post-slice encoding of the succeeding input frame after processing all slices in the succeeding input frame, comprising applying a deblocking filter for smoothing sharp edges formed between macroblocks of the succeeding input frame; the post-slice encoding of the succeeding input frame being performed after the post-slice encoding of the preceding input frame is completed.

In the method described above, the sum of a number of slices in the preceding input frame and a number of slices in the succeeding input frame is about one and a half times the number of cores or said one or more hardware processors.

Additionally, the step (a3) further comprises performing quantization for the preceding input frame producing a quantization parameter for motion estimation for said one or more slices in the succeeding input frame and rate distortion optimization; and the step (a4) further comprises performing quantization for the succeeding input frame by using the quantization parameter. In one embodiment of the invention, the output video is encoded in a H.264 format.

According to another aspect of the invention, there is provided a non-transitory computer readable storage medium, having a computer readable program code instructions stored thereon, which, when executed by a processor, perform the following: (a) encoding two successive input frames of the video, a preceding input frame and a succeeding input frame, comprising: (a1) dividing the preceding input frame into slices, each slice characterizing a spatial region within the preceding input frame; (a2) dividing the succeeding input frame into slices, each slice characterizing a spatial region within the succeeding input frame; (a3) processing one or more slices in the preceding input frame by one or more cores in a multi-core processor or by one or more hardware processors; (a4) processing a slice in the succeeding input frame provided: (i) at least one of said one or more cores in the multi-core processor or said one or more hardware processors is available for processing; and (ii) the processing of a slice from said one or more slices at same physical location in the preceding input frame has been completed; wherein the computer readable instructions cause the processor to process said one or more slices in the preceding frame and said slice in the succeeding frame at least partially in parallel.

According to yet one more aspect of the invention, there is provided a computerized system for encoding a video comprising: a processor, and a non-transitory computer readable storage medium having computer readable instructions stored thereon for execution by the processor, forming: (a) an encoding unit encoding two successive input frames of the video, a preceding input frame and a succeeding input frame, the encoding unit comprising: a1) a slicer module dividing the preceding input frame into slices characterizing respective spatial regions within the preceding input frame, and the succeeding input frame into slices characterizing respective spatial regions within the succeeding input frame; (a2) a slice processing module, processing one or more slices in the preceding input frame and one or more slices in the succeeding input frame, by one or more cores in a multi-core processor or by one or more hardware processors, provided: (i) at least one of said one or more cores in the multi-core processor or said one or more hardware processors is available for processing; and (ii) the processing of a slice from said one or more slices at same physical location in the preceding input frame has been completed; wherein the slice processing module (a2) is configured to process said one or more slices in the preceding input frame and said one or more slices in the succeeding input frame at least partially in parallel.

In the system described above, the preceding input frame and the succeeding input frame is one of the intra frame and predicted frame. For example, the preceding input frame and the succeeding input frame are predicted frames.

The slicer module and the slice processing module are configured to process two or more of the following at least partially in parallel: the dividing the preceding input frame into slices; the dividing the succeeding input frame into slices; the processing one or more slices in the preceding input frame; and the processing one or more slices in the succeeding input frame.

In the system described above, the computer readable instructions cause the processor to perform the processing a slice in the succeeding input frame immediately upon the condition (ii) is met.

The system further comprises a motion estimation module performing motion estimation of the slice in the succeeding input frame using said slice from said one or more slices at same physical location in the preceding input frame.

In the system described above, the computer readable instructions further cause the processor to: select a motion estimation window containing said one or more slices; and perform the processing a slice in the succeeding input frame provided: (iii) the processing of said one or more slices contained within the motion estimation window has been completed, the motion estimation window also containing said slice at the same physical location in the preceding input frame.

The motion estimation module is further configured to perform a motion estimation of the slice in the succeeding input frame using said one or more slices contained within the motion estimation window. Said one or more slices within the motion estimation window comprise one of the following: at least one of the slices on top and at bottom of said slice at the same physical location in the preceding input frame; both a slice on top and a slice at bottom of said slice at the same physical location in the preceding input frame; more than one slice above said slice at the same physical location in the preceding input frame; more than one slice below said slice at the same physical location in the preceding input frame; and all slices within the motion estimation window.

The motion estimation module is further configured to perform a motion estimation of the slice in the succeeding input frame using: said slice at the same physical location in the preceding input frame; and one of the following: at least one of the slices on top and at bottom of said slice at the same physical location in the preceding input frame; both a slice on top and a slice at bottom of said slice at the same physical location in the preceding input frame; more than one slice above said slice at the same physical location in the preceding input frame; more than one slice below said slice at the same physical location in the preceding input frame; and all other slices within the motion estimation window.

The system further comprises an output frame generator module, generating for each input frame, a corresponding output frame comprising processed slices; and a writer module writing the output frames in an output video.

In the system describe above, a sum of a number of slices in the preceding input frame and a number of slices in the succeeding input frame is equal to or greater than a number of said one or more cores or said one or more hardware processors.

The slice processing module further comprises a pre-slice encoding module configured to perform a pre-slice encoding of the preceding input frame before processing said one or more slices in the preceding input frame, comprising writing a frame type and a frame header into a respective output frame; and to perform a pre-slice encoding of the succeeding input frame before processing the slice in the succeeding input frame, comprising writing a frame type and a frame header into a respective output frame; the pre-slice encoding of the succeeding input frame being performed after the pre-slice encoding of the preceding input frame is completed.

The slice processing module further comprises a post-slice encoding module configured to perform a post-slice encoding of the preceding input frame after processing all slices in the preceding input frame, comprising applying a deblocking filter for smoothing sharp edges formed between macroblocks of the preceding input frame; and to perform a post-slice encoding of the succeeding input frame after processing all slices in the succeeding input frame, comprising applying a deblocking filter for smoothing sharp edges formed between macroblocks of the succeeding input frame; the post-slice encoding of the succeeding input frame being performed after the post-slice encoding of the preceding input frame is completed.

Beneficially, in the system described above, the sum of a number of slices in the preceding input frame and a number of slices in the succeeding input frame is about one and a half times the number of said cores or said one or more hardware processors.

The slice processing module further comprises a quantization module configured to perform quantization for the preceding input frame to produce a quantization parameter; and to perform quantization for the succeeding input frame by using the quantization parameter. In one embodiment of the invention, the system is configured to produce an output video in a H.264 format.

Thus, an improved method and system for encoding a video have been provided.

BRIEF DESCRIPTION OF THE DRAWINGS

Further features and advantages of the invention will be apparent from the following description of the embodiment, which is described by way of example only and with reference to the accompanying drawings, in which:

FIG. 3(a) shows an example of empty slices to process list 112 for an Available Slices Window (ASW) and a Single Slice Window (SSW) modes;

FIG. 3(b) shows an example of empty slices to process list 112 for a Multi Slice Window (MSW) mode;

DESCRIPTION OF THE EMBODIMENTS OF THE INVENTION

The embodiments of the invention employ a novel multi-frame and multi-slice parallel approach for an encoder, for example H.264 video encoder. Although the H.264 video compression standard is used in the following discussion, the approach can be extended to other video compression standards, for example, including MPEG-4 part 10, MPEG-4 part 2, MPEG-2, H.263, and VC1 standards. This method and system of the present invention describe a number of motion estimation (ME) modes, and are suitable for processing a number of slices equal or greater than the number of cores used. The configuration of the motion estimation modes and the number of slices offer various tradeoffs between speedup and visual quality loss.

Figure 1A:
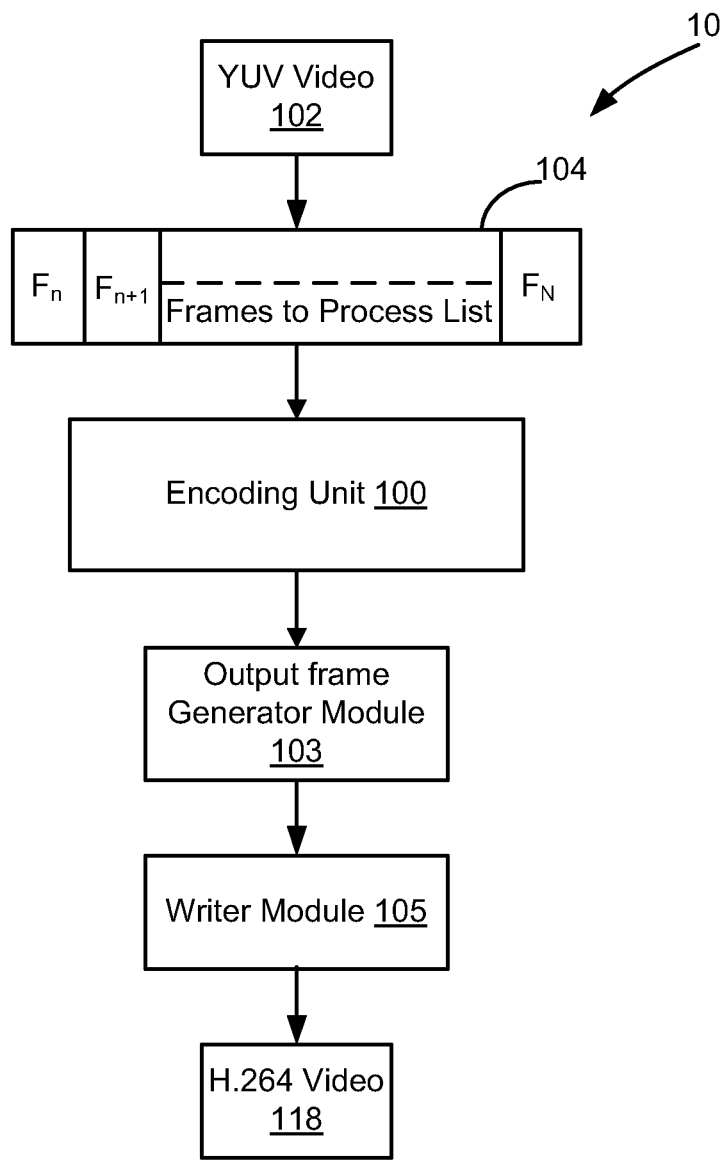
FIG. 1(a) displays system 10 for encoding of a video of the embodiment of the invention.

The system 10 of the embodiment of the current invention is explained with help of FIG. 1(a). The system 10 includes a general purpose or specialized computer having one or more CPU cores sharing a memory (e.g., a number of identical CPUs in a symmetric multiprocessing (SMP) system) and a non-transitory computer readable storage medium, e.g., memory, DVD, CD-ROM, floppy disk, flash memory, magnetic tape or other storage medium, having computer readable instructions stored thereon for execution by the CPU cores forming various modules and units that will be described in more details below. Alternatively, the system 10 of FIG. 1(a) can be implemented in firmware, or combination of firmware and a specialized computer having a computer readable storage medium.

The video to be encoded is stored in a file or stream, YUV video 102 (also referred to as input video 102 in the following discussion) and the encoded video is written in a file or a stream, H.264 video 118 (referred to as output video 118 in the following discussion). Note that H.264 is used by way of example only and the embodiments of the invention can handle other video compression standards as well as mentioned above.

Frames from the input video 102 are stored in a frames to process list 104. System 10 comprises an encoding unit 100 encoding two successive input frames of the video, a preceding input frame and a succeeding input frame. By successive frames, we consider successive frames with respect to their encoding order, which can be different from their display order. The encoding unit 100 receives its input from the frames to process list 104. The system 10 further comprises an output frame generator module 103, which receives its input from the encoding unit 100 and generates for each input frame, a corresponding output frame. The output of the output frame generator module 103 is received by a writer module 105 writing the output frames in the output video 118.

Figure 1B:
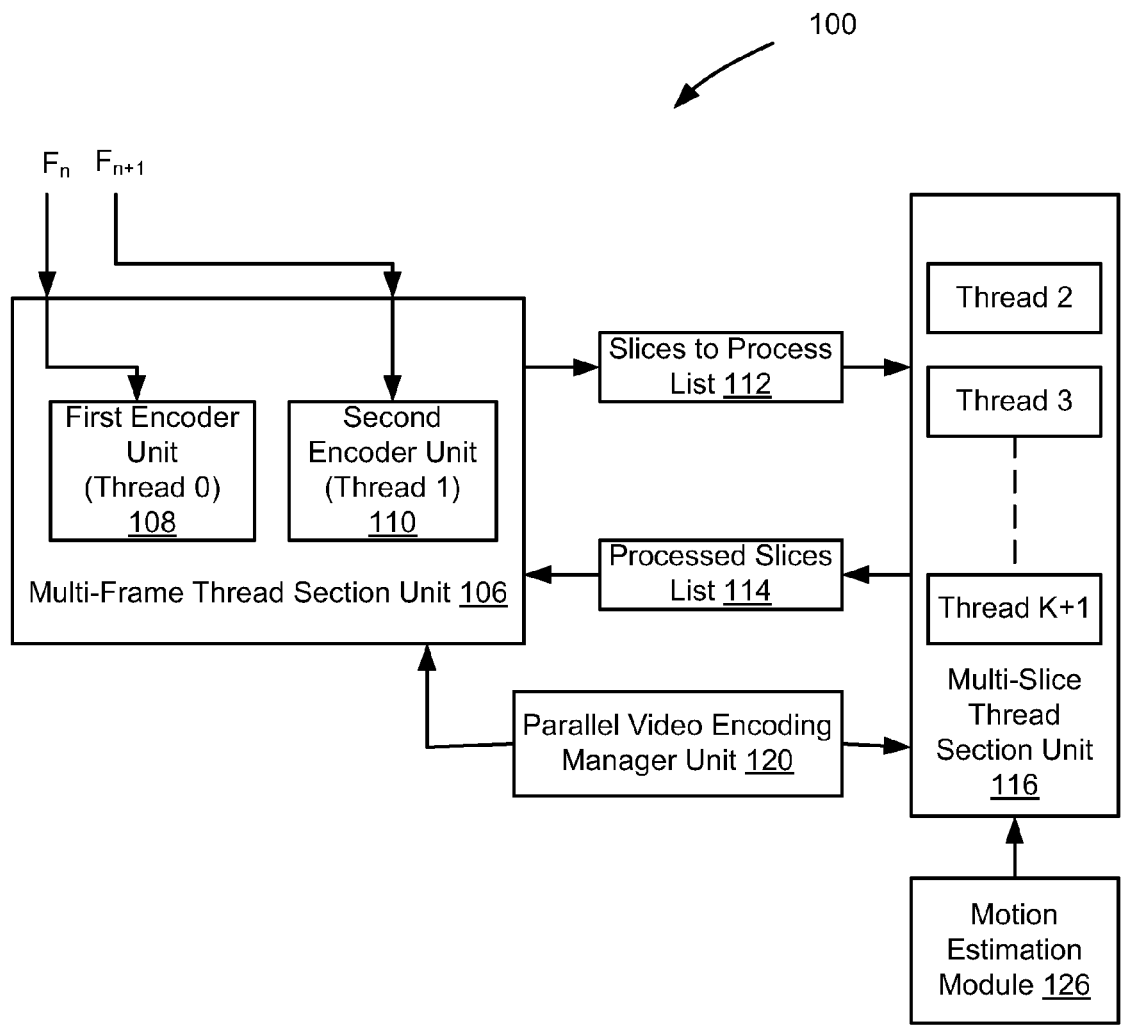
FIG. 1(b) presents the encoder unit 100 of FIG. 1(a) in more detail.
Figure 1C:
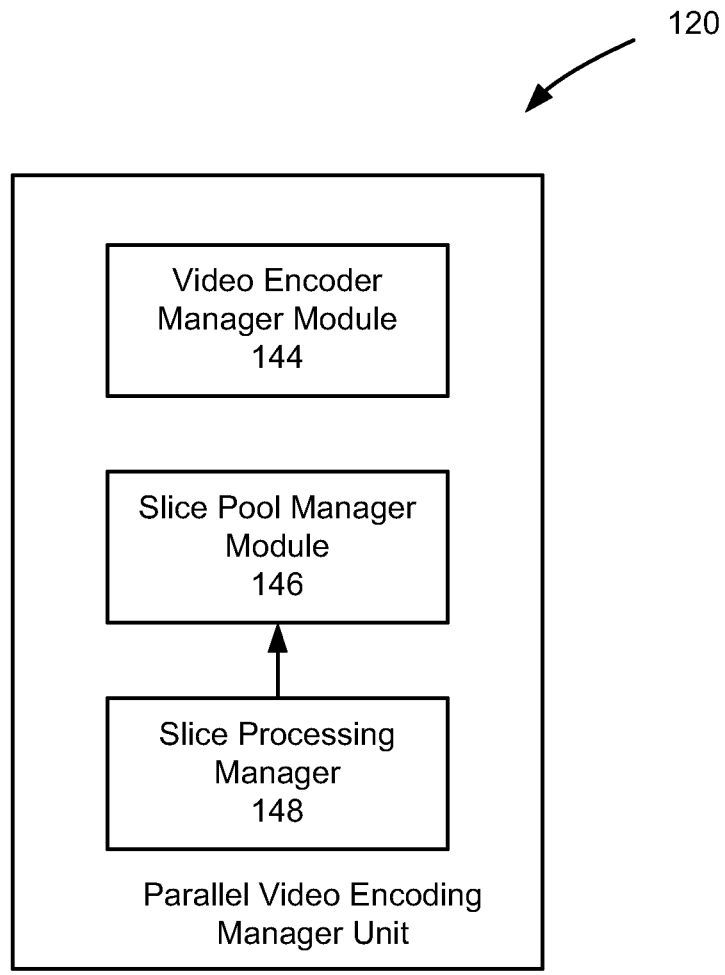
FIG. 1(c) presents parallel video encoding manager unit 120 of FIG. 1(b) in more detail.
Figure 1D:
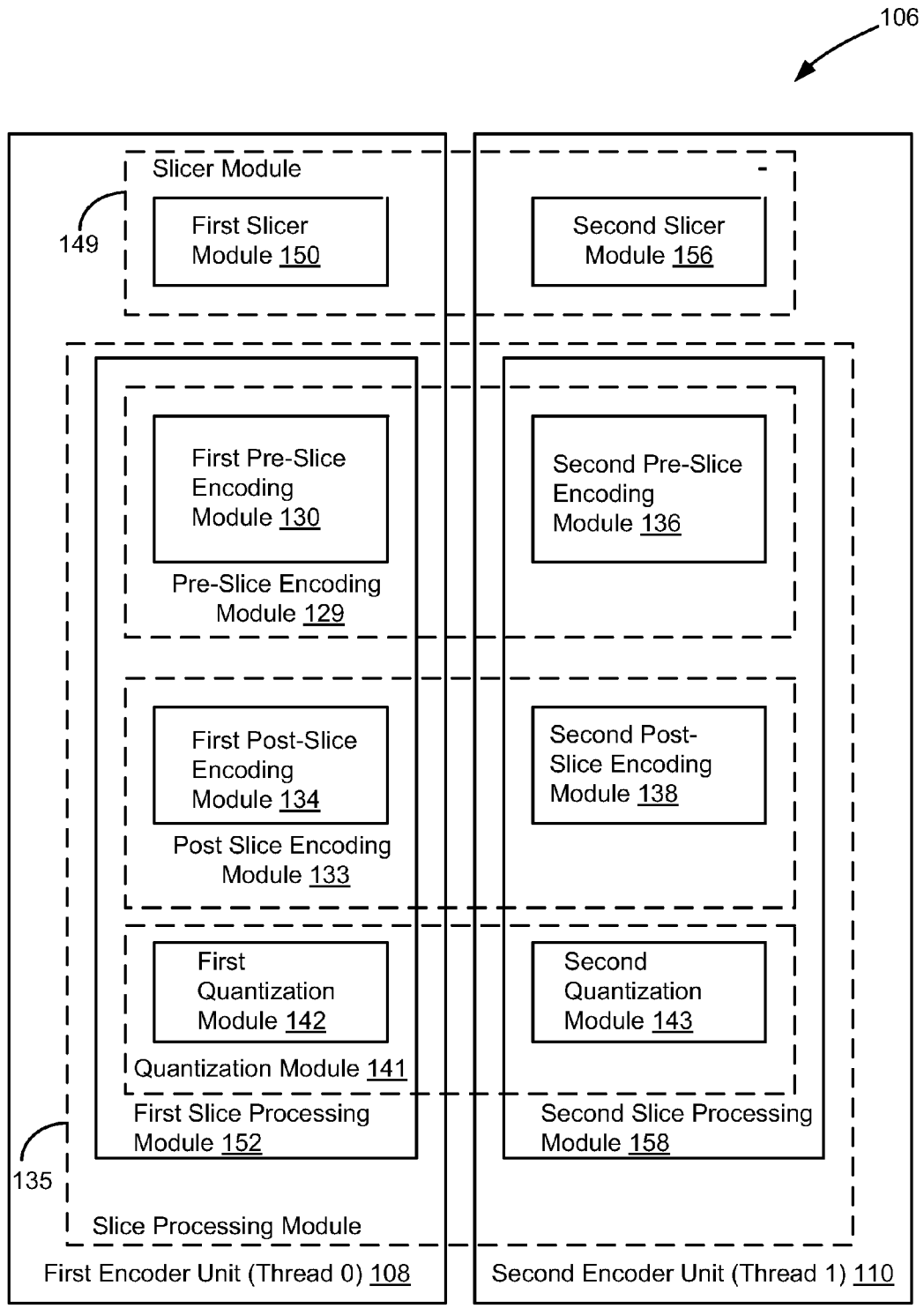
FIG. 1(d) presents multi-frame thread section unit 106 of FIG. 1(b) in more detail.
Figure 1E:
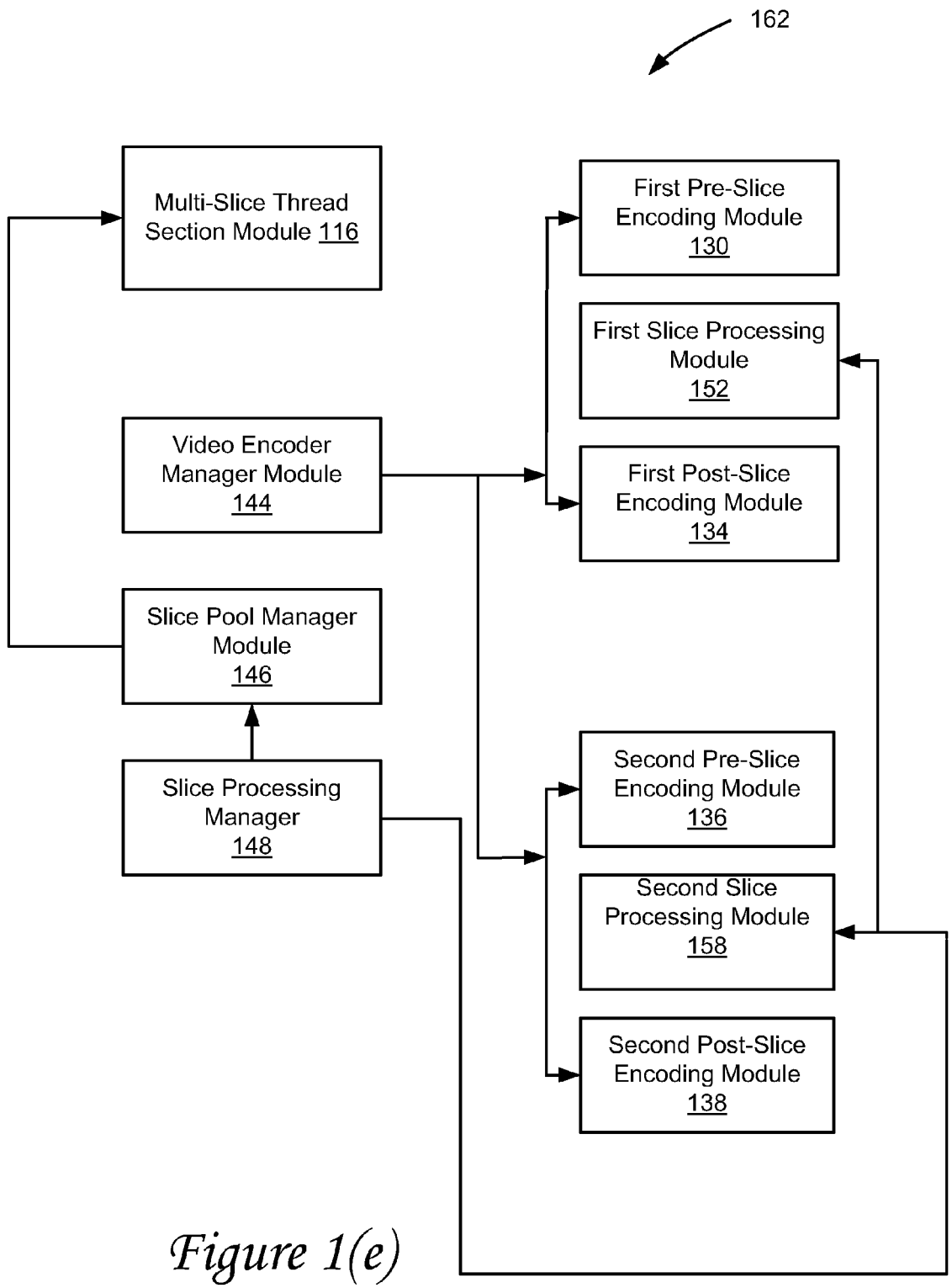
FIG. 1(e) illustrates the flow of control among selected modules of the system 10 of the embodiment of the invention.

As shown in FIG. 1(b), the encoding unit 100 comprises two thread section units: a multi-frame thread section unit 106 and a multi-slice thread section unit 116. The multi-frame thread section unit 106 receives its input from the frames to process list 104 and generates slices (explained in the following paragraph) that are stored in a slices to process list 112 that serves as input for the multi-slice thread section unit 116 that processes the slices. The processed slices produced by the multi-slice thread section unit 116 are stored in a processed slices list 114 for further processing by the multi-frame thread section unit 106. The operations of the multi-frame thread section unit 106 and the multi-slice thread section unit 116 are controlled by a parallel video encoding manager unit 120. Its responsibilities include creating two video encoders 108 and 110 and managing parallelism and synchronization between operations. The multi-frame thread section unit 106 comprises two encoders: the first encoder unit 108 (also referred to as $E_1$) and a second encoder unit 110 (also referred to as $E_2$). Each encoder unit is associated with a unique thread, and is executed at least partially in parallel with one another. The first encoder unit 108 manages even frames (0, 2, 4, etc.) and the second encoder unit 110 manages odd frames (1, 3, 5, etc.). At any given time, these two encoder units must always process neighboring input frames. An example pair of frames $F_n$ and $F_{n+1}$ shown in FIG. 1(*b*). In this example $F_n$ is a preceding input frame and $F_{n+1}$ a succeeding input frame. Please note that when $F_n$ and $F_{n+1}$ are being processed, $F_{n-1}$, the preceding input frame for $F_n$ has already been processed. The multi-slice thread section unit 116 comprises a number of threads equal to the number of cores assigned to the encoding unit 100, and as a result, the system 10 can use more threads than processors.

As indicated earlier, the input frames from the input video that are stored in the frames to process list 104 are processed by the encoding unit 100. Please note that a frame includes multiple macroblocks, each macroblock comprising multiple blocks of pixels. Parallel processing based on using a multi-core CPU or a system comprising multiple hardware processors is performed as follows. The preceding and succeeding input frames $F_n$ and $F_{n+1}$ (in the example presented in FIG. 1(*b*)), are processed at least partially in parallel. Each encoder unit, the first encoder unit 108 and the second encoder unit 110 divide $F_n$ and $F_{n+1}$ respectively, into slices of similar sizes. Because a frame is not always divisible into an equal number of MBs lines, some slices may have one more MB line. If L, N and S are the number of MB lines in a frame the number of slices and the desired size of a slice (in MB lines) respectively, then S=floor (L/N) where floor (x) is the largest integer that is smaller than or equal to x. This leads to N-R slices with size S and R slices with size S+1, where R=L modulo N. These slices are then inserted in the slices to process list 112 and processed in accordance with certain rules that are described in a later section of the present application. Subsequently, these slices are retrieved, encoded and filtered with the deblocking filter for smoothing sharp edges formed between macroblocks of an input frame by thread 2 to thread K of the multi-slice threads section unit 116. Once processed, a slice is placed in the processed slices list 114. When all the slices of a frame are processed, these slices are written into the output video.

Motion estimation is performed by using a search window referred to as the motion estimation window that is a spatial window including slices in the preceding input frame. A typical size for the window is 32×32 pixels. A larger window accommodates more slices and can potentially lead to a higher quality for the output video. Although a larger window leads to an improved quality it is accompanied by a higher processing time incurred during motion estimation. The size of the window can be chosen to strike an effective tradeoff between performance and quality for the output video.

The encoding unit 100 includes a motion estimation module 126 performing motion estimation of the slice in the succeeding input frame, the motion estimation window including the slice at the same physical location in the preceding input frame. The motion estimation module 126 can be configured to perform different types of motion estimation. For performing an unconstrained ME (discussed further in a later part of this document), the motion estimation module 126 uses a motion estimation window that, in addition to the slice at the same physical location in the preceding frame, includes more than one slice above said slice at the same physical location in the preceding input frame and more than one slice below said slice at the same physical location in the preceding input frame. For another mode of operation the motion estimation window used in motion estimation includes both a slice on top and a slice at bottom of said slice at the same physical location in the preceding input frame that are used in performing motion estimation. For yet another mode of operation, the motion estimation is performed by using only the slice at the same physical location in the preceding input frame. For an alternate mode, the motion estimation window includes both the slice on top and the slice at bottom of said slice at the same physical location in the preceding input frame, but motion estimation is performed by using the slice at the same physical location in the preceding input frame and the additional slices in the motion estimation window the processing of which are completed at the time of processing the slice in the succeeding input frame. Additional modes are possible. The additional modes include a mode in which at least one of the slices on top and at bottom of said slice at the same physical location in the preceding input frame included in the motion estimation window is used in motion estimation.

In an alternate embodiment smaller slices are supported. Each row in the frame comprises multiple slices. Thus, with multiple rows in a frame a slice can have nine adjacent slices surrounding the slice currently bring processed: one on top, one at bottom, one on left, one on right and one on each of the four corners of the slice. All the nine slices that are adjacent to the slice at the same physical location in addition to the slice at the same physical location in the preceding input frame are included in the motion estimation window and can be used to perform an unconstrained ME. A number of variations are possible including a mode in which only a subset of the nine adjacent slices in addition to the slice at the same physical location in the preceding input frame are used or only the adjacent slices (in the preceding input frame) the processing of which are completed at the time of performing motion estimation of the given slice in the succeeding input frame are used in addition to the slice at the same physical location in the preceding input frame.

The various modules that are included in the parallel video encoding unit 120 are captured in FIG. 1(*c*) and are described next.

Video Encoder Manager Module 144 is responsible for managing the multi-frame thread section unit 106. It creates two video encoders: the first encoder unit 108 and the second encoder unit 110. Its responsibilities also include synchronizing the operations of the first encoder unit 108 and the second encoder unit 110.

Slice Pool Manager Module 146 selects the next slice to process based on the motion estimation mode as will be discussed in more details below.

Slice Processing Manager Module 148 is responsible for selecting the next slice to process for assigning to a free thread when one becomes available. It calls the slice pool manager 146 to get the next slice to process.

The modules included in the multi-frame thread section unit 106 are presented in FIG. 1(*d*) and are discussed next.

Slicer Module 149 divides the preceding input frame into slices characterizing respective spatial regions within the preceding input frame, and the succeeding input frame into slices characterizing respective spatial regions within the succeeding input frame. The slicer module in turn comprises a first slicer module 150 and a second slicer module 156.

First slicer module 150 is included in the first encoder unit 108 and divides the input frame currently handled by the first encoder unit 108 into slices, each slice characterizing a spatial region within the input frame. Please note that at different points in time the first slicer module may be handling a preceding frame and a succeeding frame. This is because an even numbered frame $F_2$, for example is a succeeding frame when it is processed in parallel with $F_1$ and a preceding frame when it is processed in parallel with $F_3$.

Second slicer module 156 is included in the second encoder unit 110 and divides the succeeding input frame into slices, each slice characterizing a spatial region within the preceding input frame. As in the case of the first slicer module the second slicer module 156 may be handling a preceding frame and a succeeding frame at different points in time.

Slice processing module 135 processes one or more slices in the preceding input frame and one or more slices in the succeeding input frame. The slice processing module in turn comprises a first slice processing module 152 and a second slice processing module 158.

First slice processing module 152 is included in the first encoder unit 108 and processes one or more slices in an input frame by one or more cores in a multi-core processor or by one or more hardware processors. The first slice processing module 152 receives its input from the slice processing manager module 148. Its responsibilities include encoding the slices in the even frames of the input video. The operations performed by this module are CPU-intensive.

Second slice processing module 158 is included in the second encoder unit 110 and processes slices in the odd input frames. The second slice processing module 158 receives its input from the slice processing manager module 148. Its responsibilities include encoding the slices in the odd frames of the input video. The operations performed by this module are CPU-intensive.

Please note that as in the case of the first slicer module 149, the first slice processing module 152 and the second slice processing module 158 may be handling a preceding frame and a succeeding frame at different points in time.

The operations of the first slice processing module 152 and the second slice processing module 158 are performed at least partially in parallel.

The slice processing module 135 includes pre-slice encoding module 129 that is configured to perform a pre-slice encoding of the preceding input frame before processing said one or more slices in the preceding input frame, comprising writing a frame type and a frame header into a respective output frame and performing a pre-slice encoding of the succeeding input frame before processing the slice in the succeeding input frame, comprising writing a frame type and a frame header into a respective output frame. The pre-slice encoding of the succeeding input frame is performed after the pre-slice encoding of the preceding input frame is completed.

The pre-slice slice encoding module 129 in turn comprises a first pre-slice encoding module 130 and a second pre-slice enclosing module 138.

First pre-slice encoding module 130 is included in the first encoder unit 108 and performs a pre-slice encoding of an input frame processed by the first encoder unit 108 before processing one or more slices in the input frame, comprising writing a frame type and a frame header into a respective output frame.

Second pre-slice encoding module 136 is included in the second encoder unit 110 and performs a pre-slice encoding of the input frame handled by the second encoder unit 110 before processing one or more slices in the input frame, comprising writing a frame type and a frame header into a respective output frame.

As in the case of the first slicer module 149, the first pre-slice encoding module 130 and the second pre-slice encoding module 136 included in the pre-slice encoding module may be handling a preceding frame and a succeeding frame at different points in time.

The slice processing module 135 further comprises a post-slice encoding module 133 that performs a post-slice encoding of the preceding input frame after processing all slices in the preceding input frame, comprising applying a deblocking filter for smoothing sharp edges formed between macroblocks of the preceding input frame; and performs a post-slice encoding of the succeeding input frame after processing all slices in the succeeding input frame, comprising applying a deblocking filter for smoothing sharp edges formed between macroblocks of the succeeding input frame. The post-slice encoding of the succeeding input frame is performed after the post-slice encoding of the preceding input frame is completed.

The post-slice encoding module 133 in turn comprises a first post-slice encoding module 134 and a second post-slice encoding module 138.

First post-slice encoding module 134 is included in the first encoder unit 108 and performs a post-slice encoding of the input frame being handled by the first encoder unit 108 after processing all slices in the input frame, comprising applying a deblocking filter for smoothing sharp edges formed between macroblocks of the input frame and updating the rate control status.

Second post-slice encoding module 138 is included in the second encoder unit 110 and performs a post-slice encoding of the input frame handled by the second encoder unit 110 after processing all slices in the succeeding input frame, comprising applying a deblocking filter for smoothing sharp edges formed between macroblocks of the input frame and updating the rate control status.

As in the case of the first slicer module 149, the first post-slice encoding module 134 and the second post-slice encoding module 138 included in the post-slice encoding module 133 may be handling a preceding frame and a succeeding frame at different points in time.

The slice processing module 135 also includes a quantization module 141 configured to perform quantization for the preceding input frame to produce a quantization parameter; and perform quantization for the succeeding input frame by using the quantization parameter. The quantization module comprises a first quantization module 142 and a second quantization module 143.

First quantization module 142 is included in the first encoder unit 108 and performs quantization of the input frame currently handled by the first encoder unit 108.

Second quantization module is included in the second encoder unit 110 and performs quantization of an input frame currently handled by the second encoder unit 110.

As in the case of the first slicer module 149, the first quantization module 142 and the second quantization module 143 included in the quantization module 141 may be handling a preceding frame and a succeeding frame at different points in time.

The operations of two or more of the first slicer module, the second slicer module, the first slice processing module and the second slice processing module are performed at least partially in parallel.

The flow of control among a number of modules is captured in diagram 162 displayed in FIG. 1(*e*). Although the first slice processing module 152 comprises the first pre-slice encoding module 130 and the first post-slice encoding module 134 they are shown as separate boxes to avoid cluttering. For a similar reason, although the second slice processing module 158 comprises the second pre-slice encoding module 136 and the second post-slice encoding module 138 they are shown as separate boxes. Since FIG. 1(e) concerns the flow of control among the modules data repositories such as the frames to process list 104, the slices to process list 112 and the processed slices list 114 are not included. The slice pool manager module 146 controls the operations of the multi-slice thread selection unit 116 by selecting the next slice to process. The video encoder manager module 144 controls the first pre-slice encoding module 130 and the first post-slice encoding module 134 as well as the second pre-slice encoding module 136 and the second post-slice encoding module 138. The slice processing manager 148 controls the operations of the first slice processing module 152 and the second slice processing module 158 for assigning the next slice to process to a free thread when one becomes available. The slice processing manager 148 calls the slice pool manager 146 to get the next slice to process.

All the components of the system 10 that include units 100, 106, 108, 110, 116, 120 and modules 103, 105, 126, 129, 130, 133, 134, 135, 136, 138, 141, 142, 143, 144, 146, 148, 149, 150, 152, 156, 158, include a firmware or, alternatively, computer readable instructions stored in a non-transitory computer readable storage medium for execution by a processor. All the lists including the frames to process list 104, the slices to process list 112 and the processed slices list 114 are data structures stored in memory. The YUV video 102 and the H.264 video are streams or files stored on a non-transitory computer readable storage medium.

Figure 2A:
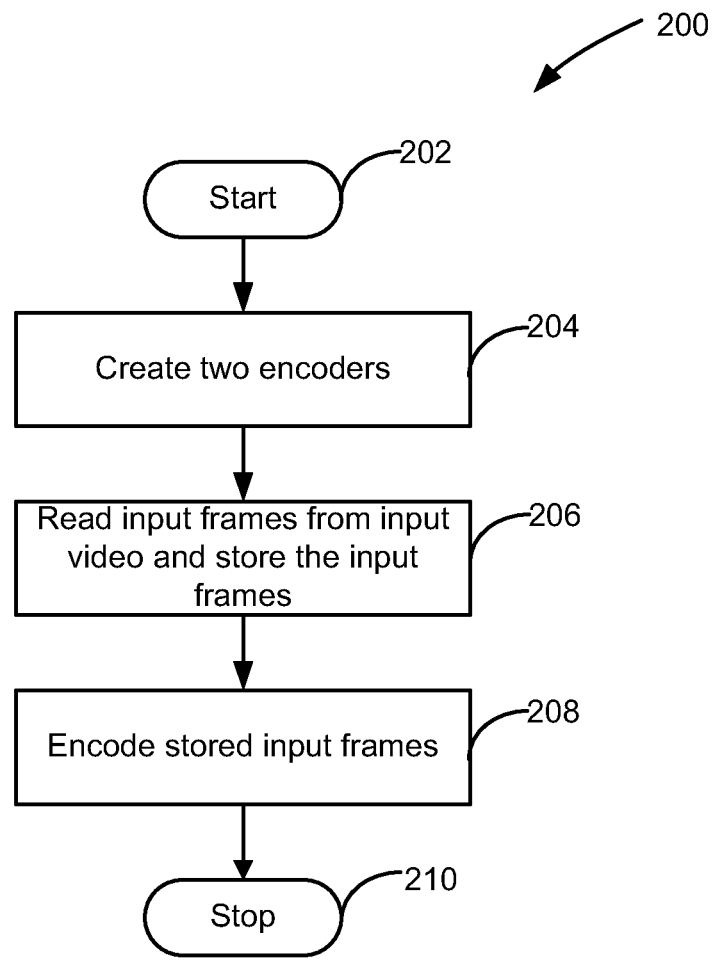
FIG. 2(a) presents the steps of the method for encoding a video of the embodiment of the invention.

The method of the embodiment of the invention is explained with the help of flowchart 200 captured in FIG. 2(a). Upon start (box 202), the procedure 200 creates two encoders 108 and 110 that operate at least partially in parallel to encode the input video (box 204). The procedure 200, then reads the input frames from the input video 102 and stores these input frames in the frames to process list 104 (box 206). Next the procedure 200 encodes the stored input frames (box 208) and exits (box 210).

Figure 2B:
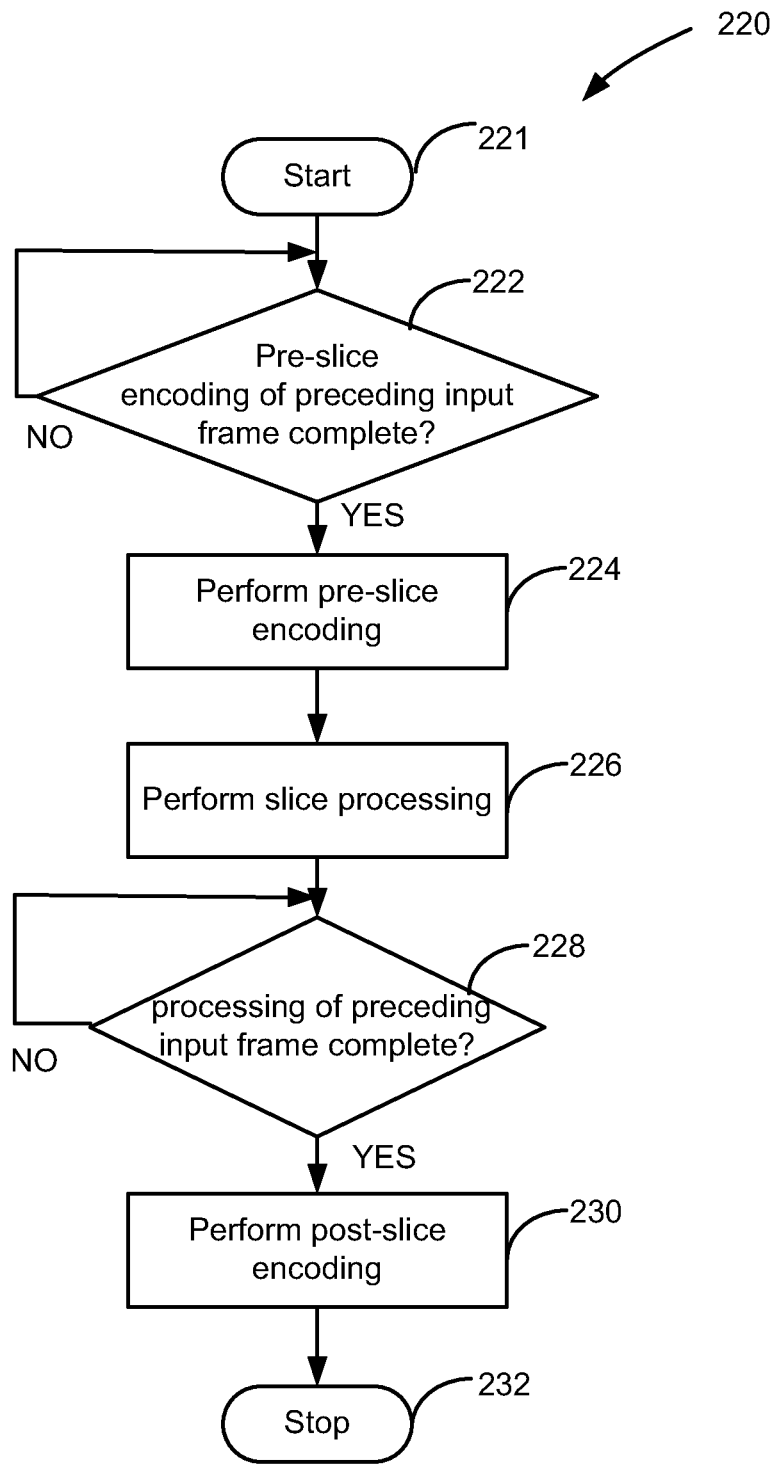
FIG. 2(b) presents the operations performed in box 208 of FIG. 2(a) in more details.
Figure 2C:
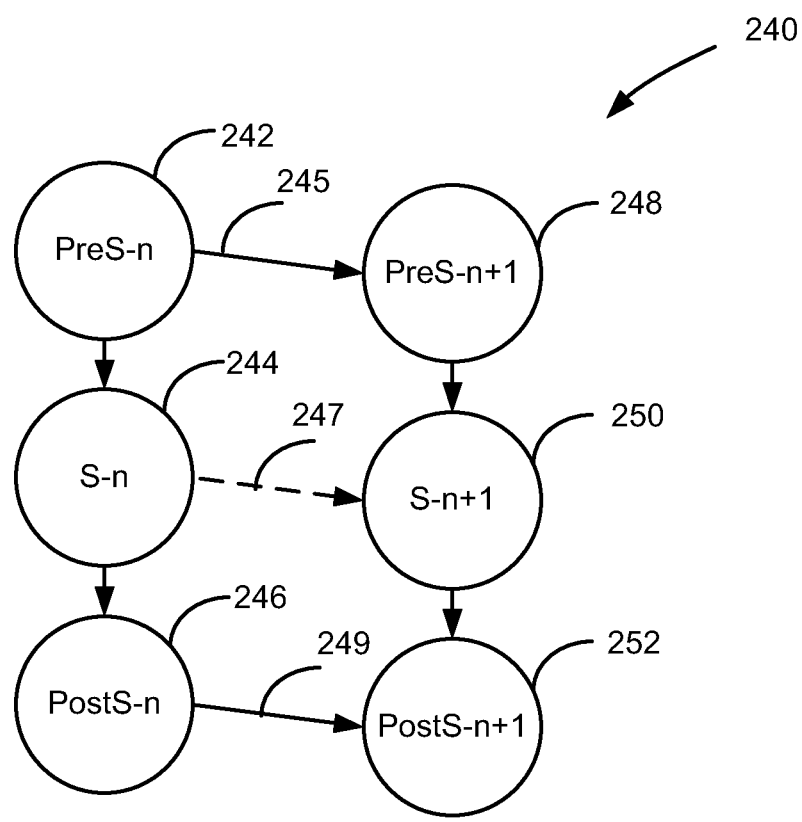
FIG. 2(c) presents a graph capturing the precedence relationships among the operations performed during the encoding of slices.
Figure 2D:
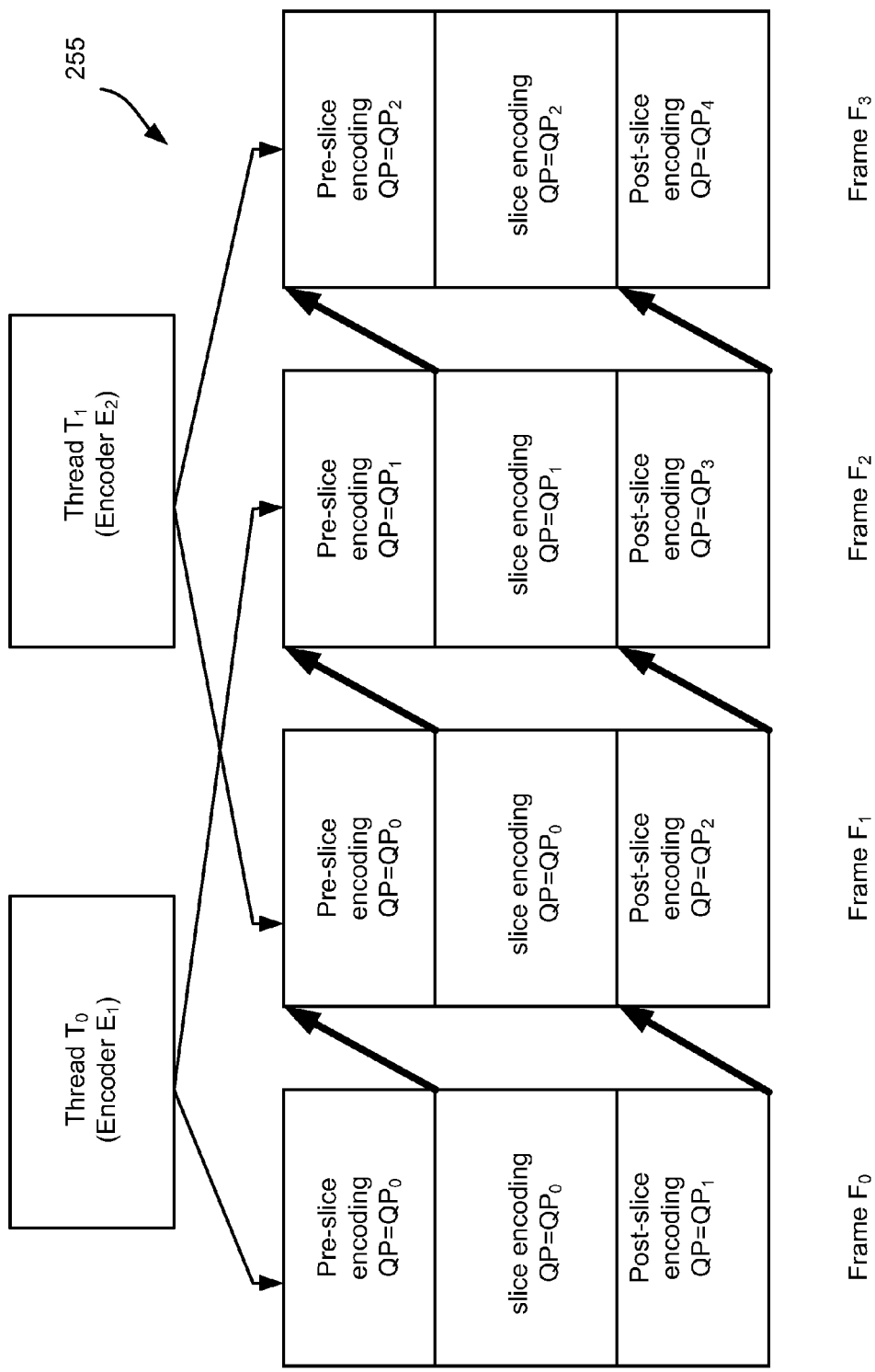
FIG. 2(d) provides an example used for explaining the processing dependencies during quantization and their effect on rate control.
Figure 2E:
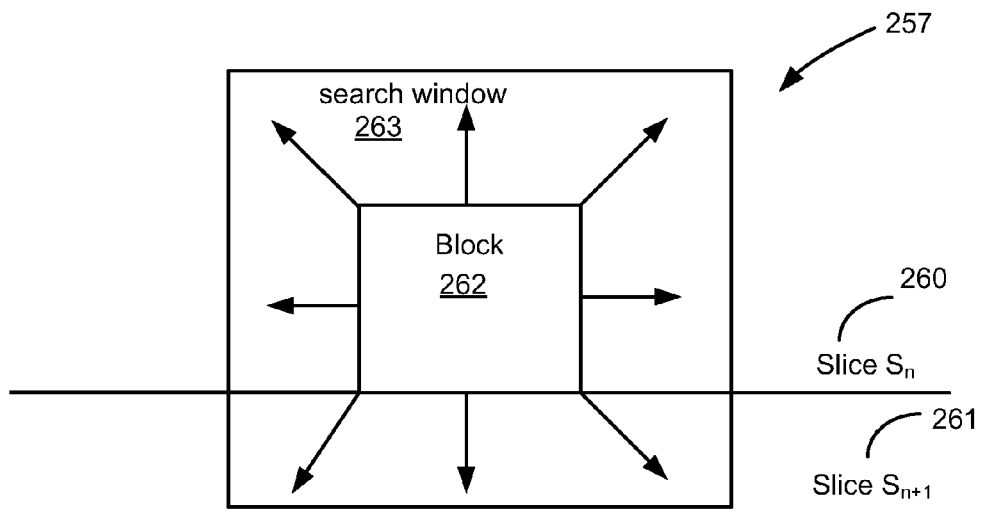
FIG. 2(e) shows an example displaying uncontrolled motion estimation.
Figure 2F:
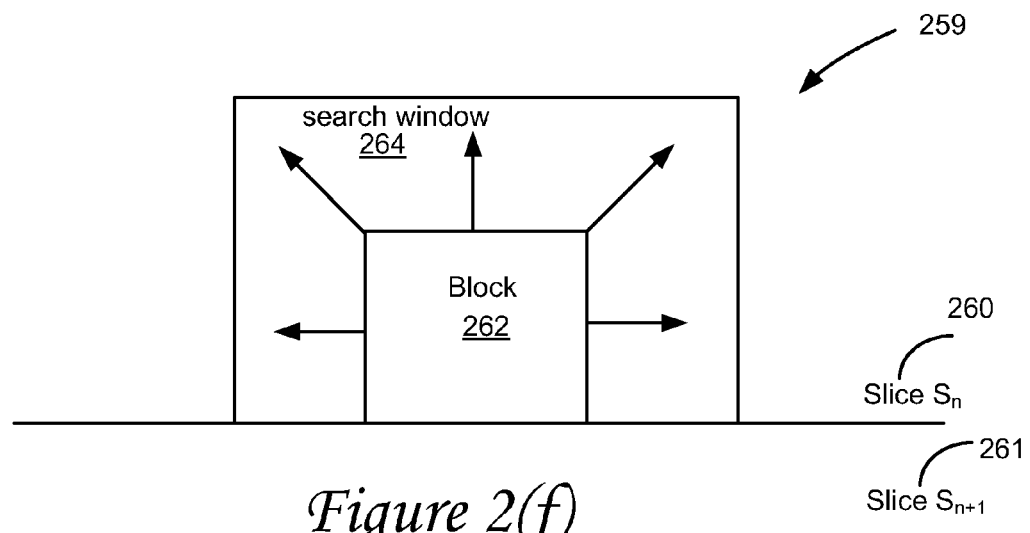
FIG. 2(f) shows an example displaying motion estimation constrained to the current slice's limits.

The operations performed in box 208 are explained further with the help of flowchart 220 presented in FIG. 2(b). The graph 240 in FIG. 2(c) shows processing dependency relationships between neighboring input frames. The processing of each frame is divided into three parts: pre-slice encoding (pre-slice processing), slice encoding (slice processing), and post-slice encoding (post-slice processing). Please note that as indicated in the previous sentence the terms "encoding" and "processing" are used interchangeably in this patent application. The pre-slice encoding comprises operations prior to the actual slice processing, such as determining the frame type and writing the frame header into a respective output frame. The pre-slice encoding is performed by the first and second pre-slice encoding modules 130 and 136. The post-slice encoding comprises operations after the actual slice processing, such as applying the parallel deblocking filter and updating the rate control status. A deblocking filter involves a process applied on reference frames to improving their appearance. Video compression has the effect of introducing different kinds of distortions, also called compression artifacts, on processed frames. Blocking artifacts are the most visible artifacts on a frame. The deblocking filter is applied to reduce these artifacts. The deblocking filter achieves its objectives by smoothing edges in between macroblocks of pixels in the input frame. The post-slice encoding is performed by the first and second post-slice encoding modules 132 and 138.

The slice processing includes encoding the frame's slices and represents the most CPU-intensive part of the video encoding process. The pre-slice encoding of a frame $F_{n+1}$ can only be started when the pre-slice processing of frame $F_n$ has been completed. Similarly, the post-slice processing of a frame $F_{n+1}$ can only be started when frame $F_n$ has been completely processed. Before explaining the operations of flowchart 220 the dependency among the operations performed are explained. Each encoder unit is mapped to a separate thread: the first encoder unit 108 to thread 0 and the second encoder unit 110 to thread 1. Thread 0 processes frame $F_n$ and thread 1 frame $F_{n+1}$.

Graph 240 in FIG. 2(c) shows the processing dependency relationships between neighboring frames. Each node (shown as a circle) in the graph 240 represents a task that comprises a group of operations and each directed edge between two tasks shows the precedence relationship: the task at the head of the edge must complete before the task at the tail of the edge can start executing. For example, the directed edge 245 signifies that PreS-n 242 must complete before PreS-n+1 240 can start executing. The processing of each frame is performed by three types of nodes: pre-slice processing, slice processing, and post-slice processing denoted by PresS, S and PostS in graph 240. The strings n and n+1 are used to designate the frame number (n or n+1) processed by the task. The pre-slice encoding of a frame $F_{n+1}$ can only be started when the pre-slice encoding of frame $F_n$ has been completed. Similarly, the post-slice processing of a frame $F_{n+1}$ can only be started when frame $F_n$ has been completely processed.

As shown in FIG. 2(c), the PreS-n 242 pre-slice processing of frame $F_n$, S-n 244 slice processing of frame $F_n$, and PostS-n 246 post-slice processing of frame $F_n$ are performed sequentially: PresS-n 242 is performed first followed by S-n 244, followed by PostS-n 246. Similarly the PreS-n+1 248 pre-slice processing of frame $F_{n+1}$, S-n+1 250 slice processing of frame $F_{n+1}$, and PostS-n+1 252 post-slice processing of frame $F_n$ are also performed sequentially. However, PreS-n 242 need to be completed before the Pre-Sn+1 248 can start, and PostS-n 246 needs to be completed (that signifies the completion of processing of the entire frame $F_n$) before PostS-n+1 252 can start. The edge shown by a dotted arrow 247 between S-n 244 and S-n+1 250 indicates that although S-n and S-n+1 can execute concurrently there are processing dependencies between a given slice in $F_{n+1}$ and its reference slices in $F_n$.

The graph 240 shown in FIG. 2(c) governs the operations performed by the method captured in flowchart 220 of FIG. 2(b). The procedure is executed by the second encoder unit 110 that processes the succeeding input frame. Upon start (box 221), procedure 220 checks if the pre-slice encoding of the preceding input frame has been completed (box 222). If not, it exits 'NO' from box 222 and loops back to the entry of box 222. Otherwise, the procedure 220 exits 'YES' from box 222, performs pre-slice processing for the succeeding input frame (box 224) and then the slice processing for the succeeding input frame (box 226). Whether or not the processing of the preceding input frame is completed is checked next (box 228). If not, the procedure 220 exits 'NO' from box 228 and loops back to the entry of box 228. Otherwise, the procedure exits 'YES' from Box 228 and performs post-slice processing for the succeeding input frame (box 230) and exits (box 232). Please note procedure 220 is executed for the succeeding input frame $F_{n+1}$ only.

Quantization is an important component of slice processing, which is needed for rate distortion optimization and during motion estimation. The slice processing (box 226) component of encoding a succeeding frame $F_{n+1}$, for example, can only be started not only after completion of its pre-slice encoding, but it also depends on the availability of its reference slices (as discussed in a later section of this patent application). These dependency relationships have the effect of introducing a delay of one frame in the quantization parameter (QP) determination during encoding of an input frame. The QP for a frame is available after the completion of encoding of this frame. Since encoding of various slices in $F_{n+1}$ are performed concurrently and the quantization $QP_{n+1}$ is not available during this processing of slices in $F_{n+1}$, a quantization equal to $QP_n$, the QP computed after the encoding of frame $F_{n-1}$, is applied instead of $QP_{n+1}$. For example, $QP_1$ is computed in the post-slice encoding section of frame $F_0$ and only used when encoding frame $F_2$. This delay causes rate control to be less precise over short periods (few frames), but does not significantly affect the global video quality and size. An example of this delay in quantization is presented in diagram 255 in FIG. 2(*d*) which also captures and the precedence relationships (discussed earlier) between the pre-slice encoding, slice encoding and the post-slice encoding of neighboring frames (shown by bold arrows).

Motion estimation (ME) is an important aspect of video encoding. The embodiments of the current invention include three motion estimation (ME) modes that offer various tradeoffs between speedup and visual quality of the output image. Usually, ME is performed inside a square search window (for example, 32×32 pixels) of the reference frame which is the preceding input frame for the frame for which ME is being performed. ME is performed on blocks of pixels of variable sizes (e.g. 16×16 pixels, or 8×8 pixels). For an unconstrained motion estimation, when multiple slices are processed in parallel, this approach has the disadvantage of forcing the encoder to process a new slice only when all its reference slices (in the preceding input frame) have been processed (as shown in diagram 257 in FIG. 2(*e*)), thus leading to a delay when it needs to wait for the completion of one or more of them. FIG. 2(*e*) shows an example preceding frame used for performing ME on a block in the corresponding succeeding frame. Slice $S_n$ 260, is located immediately above slice $S_{n+1}$ 261. Motion estimation is being performed for a block in a slice in the succeeding input frame that occupies the same physical location as slice $S_n$ 260. Block 262 in the pre-ceding input frame occupies the same position as the block in the succeeding input frame for which ME is being performed. The search window 263 is used by the unconstrained ME and a block 262 physically located at the bottom of slice $S_n$ 260 and on top of neighboring slice $S_{n+1}$ 261. Please note that the term unconstrained in this context means that the ME is not constrained to specific slices but to the desired search window. For the example provided in diagram 257, ME can only be started when the encoding of both slice $S_n$ 260 and slice $S_{n+1}$ 261 in the preceding input frame has been completed. ME is performed using block matching between the processed block and blocks contained in the search window. Motion estimation returns a motion vector indicating the relative position of the block from preceding input frame that matches most closely the processed block in the succeeding input frame for which ME is being performed, given a distortion criterion such as the sum of absolute difference or the mean squared error. In general, reference slices for a given slice are located in the preceding input frame and include all the slices that are covered by the search window 263. For example, one of the ME modes supported by the embodiments of the invention includes three slices: the slice at the same physical location as the given slice (for which ME is being performed) and a slice at the top and a slice at the bottom of the slice at the same physical location as the given slice. This first ME mode, named Multi Slice Window (MSW), forces the encoder to process a new slice only when all its reference slices are available (i.e. when it can perform an unconstrained ME). This is the slowest mode, but it provides the best video quality.

To reduce the waiting time, the second mode, named Single Slice Window (SSW), adds an additional constraint to the ME process: ME is performed inside the current slice's limits (as shown in diagram 259 presented in FIG. 2(*f*)). Search window 264 extends only within slice $S_n$ 260. Thus, pixels belonging to the slice $S_{n+1}$ 261 are no longer available for motion estimation. Although this is the fastest mode, it can adversely affect the visual quality of the output image the most. SSW allows to start the processing of a slice when only one of its reference slices, the slice located at the same spatial position in the preceding input frame, becomes available. The quality loss is caused by the reduction of the search window, which reduces the effectiveness of the temporal prediction algorithm (motion estimation). This quality loss is generally greater in a video sequence containing dominant vertical motion, because the motion estimation algorithm cannot track a block of pixels that moves from one slice to another.

The third mode, named Available Slices Window (ASW), is similar to the second mode, but extends the ME to the two additional reference slices (one at the top and one at the bottom of the slice at the same physical location in the preceding frame) that have already been processed. Please note that the additional reference slices can be extended to include more than two reference slices if a larger search window is used. Thus, once the reference slice (in the preceding input frame) at the same physical location as the slice in the succeeding window being processed is completed processing, the slice in the succeeding input frame will be processed using only the other reference slices the processing of which are completed at that time. Clearly, the waiting period is the same as in the case of SSW, but quality of ME is potentially improved by using the additional reference slices that may have been processed at the time of completion of the processing of the reference slice (in the preceding input frame) occupying the same physical location as the slice in the succeeding input frame. This mode is a compromise, in terms of speedup and quality, between the two others modes.

The reference slices for the three motion estimation modes provided by the estimation of the invention are explained with the help of FIG. 2(*i*) in more detail in a later section of this patent application.

Slices are processed by the multi-slice thread section unit 116 and the next slice to process from the slices to process list 112 is selected by the slice pool manager module 146. The selection of a next slice to process performed by the slice pool manager 146 is explained with the help of flowchart 280 displayed in FIG. 2(*g*). Upon start (box 282), the procedure 280 checks whether or not the mode for ME is MSW (box 284). If so, the procedure 280 exits 'YES' from box 284, selects the first slice (from the slices to process list 112) for which all the three reference slices in the preceding input frame (the slice occupying the same physical location as the slice in the succeeding input frame, along with the slice on its top and the slice at its bottom) have been processed (box 286) and exits (box 290). Otherwise, the procedure exits 'NO' from box 284, selects the first slice for which the slice (in the preceding input frame) at the same physical location in the preceding input frame has been processed (box 288) and exits (box 290). In an alternate embodiment the procedure 280 selects the slice for which all the reference slices required to perform an unconstrained ME including the slice at the same physical location (in the preceding input frame) as the slice in the succeeding input frame and one or more slices on the top and one or more slices below this slice at the same physical location in the preceding input frame have been processed. In yet another embodiment the slice at the same physical location in the preceding input frame and at least one of the slices on top or at bottom of the slice at the same physical location in the preceding input frame are used as reference slices.

The motion estimation module 126 can be configured to operate in three different modes. Operation of each configuration is described in further details with the help of flowchart 300 displayed in FIG. 2(h). Upon start (box 302), the procedure 300 checks whether or not an ASW mode for ME is being used. If so, it exits 'YES' from box 304, performs motion estimation for the slice in the succeeding input frame using only its reference slices including the one at the same physical location as the slice being processed that have been processed (box 306) and exits (box 314). Otherwise, it exits 'NO' from box 304 and checks if the mode is SSW (box 308). If so, it performs motion estimation for the current slice by using only the reference slice that occupies the same physical location (as the slice being processed) in the preceding input frame (box 310) and exits (box 314). Otherwise, it exits 'NO' from box 308, performs motion estimation using all the three of its reference slices: slice at the same physical location in the preceding input frame and both a slice on top and a slice at the bottom of the slice at the same physical location in the preceding input frame (box 312) (MSW mode) and exits (box 314). In another embodiment the slice at the same physical location in the preceding input frame as the slice in the succeeding input frame being processed and one or more of all the slices that are above and below the slice at the same physical location in the preceding input frame can be used to perform an unconstrained ME are used in motion estimation.

Figure 2G:
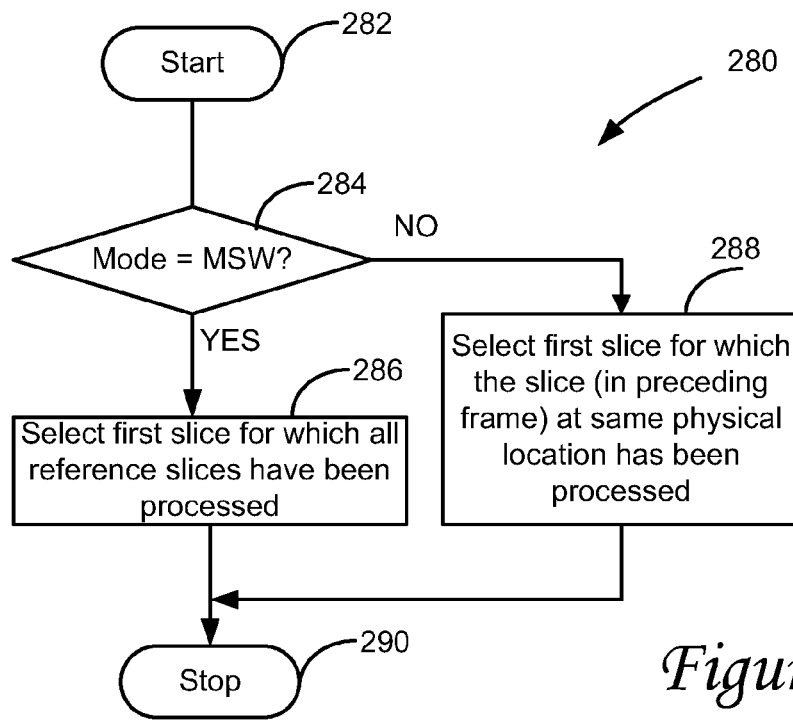
FIG. 2(g) presents the steps of the method used for selection of a slice for processing.
Figure 2H:
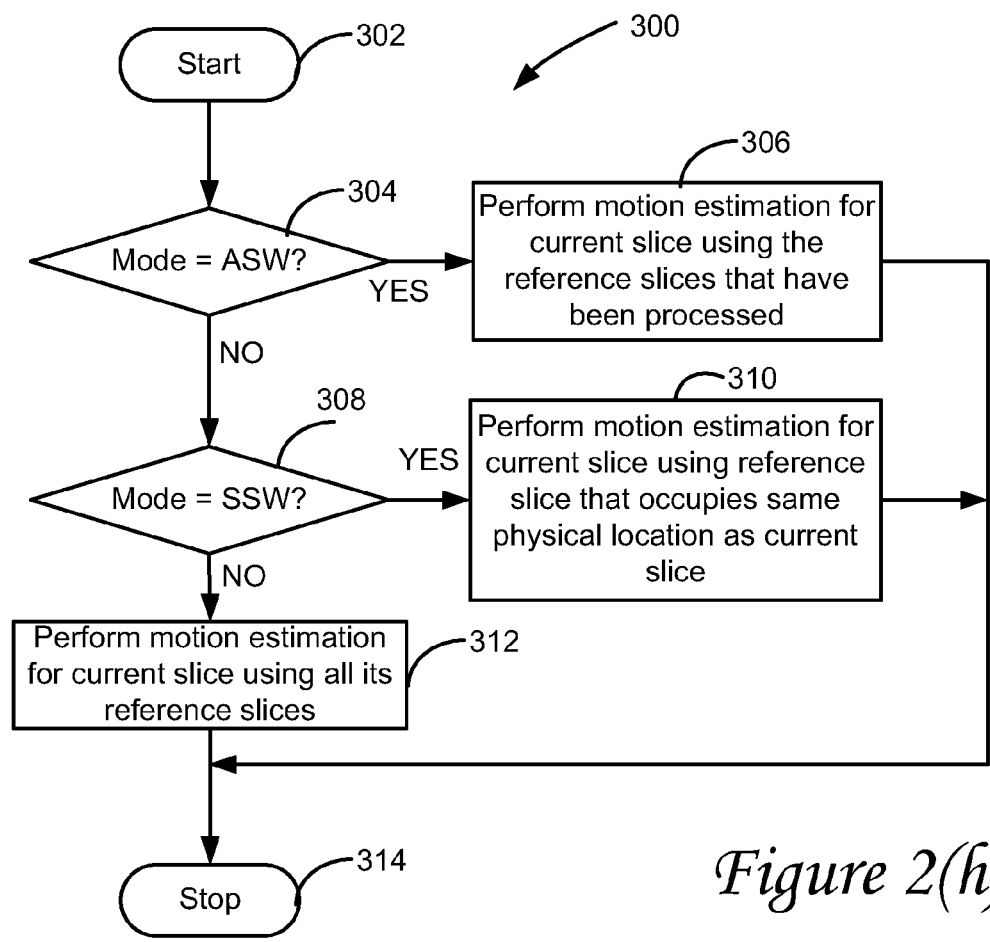
FIG. 2(h) illustrates the steps of the method used for motion estimation for a slice.
Figure 2I:
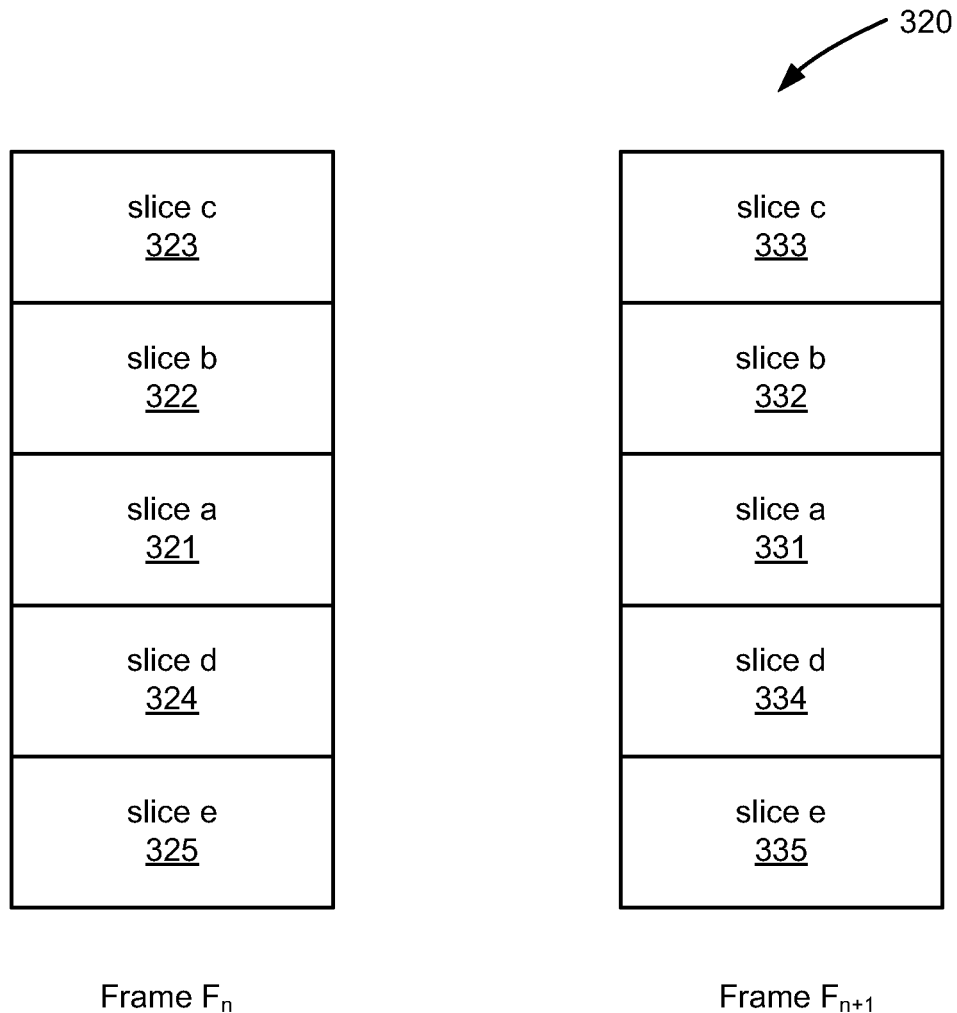
FIG. 2(i) illustrates the use of reference slices for the various motion estimation modes.

The reference slices in the preceding input frame that are used in the selection of the next slice to process by procedure 280 in FIG. 2(g) and in motion estimation by the procedure 300 in FIG. 2(h) are explained further with the help of an example provided in diagram 320 presented in FIG. 2(i). The preceding frame ($F_n$ in this example) comprises five slices: slice a 321, slice b 322, slice c 323, slice d 324 and slice e 325. The succeeding input frame ($F_{n+1}$ in this example) comprises five slices: slice a 331, slice b 332, slice c 333, slice d 334 and slice e 335. Two slices labeled with the same letter (such as slice a 321 and slice a 331) occupy the same physical location in the two input frames. Consider a situation in which ME is performed for slice a 331 in the succeeding input frame. For the MSW mode the search window is selected in such a way that the reference slices include the slice a 321 occupying the same physical location as slice 331, slice b 322 situated on top of slice 321 and slice d 324 located at the bottom of slice 321. For a motion estimation mode of SSW only the slice a 321, that occupies the same physical location as slice a 331 for which motion estimation is being performed is used. For the ASW mode the motion estimation for slice a 331 starts when the processing of slice a 321 is completed, but those of the slices: slice b 322 and slice d 324 the processing of which are also completed at that time are also used in addition to slice a 321 for performing motion estimation.

In prior art using a pure multi-slice parallel approach, each frame must have a number of slices equal to the number of processor cores to keep all of them as active as possible during the encoding process. However, since some slices are less complex to process than others, workload balancing is not perfect. Adding supplementary slices (SSs) in this prior art has the inconvenient of further unbalancing the workload.

In the proposed multi-slice and multi-frame approach of the embodiments of the present invention, however, adding slices has positive effects on load balancing. When the number of slices equals the number of threads, there will not be enough slices to fill the slices to process list 112 to keep all the cores busy at all times. FIG. 3 shows two examples where the slices to process list 112 becomes empty: one for the SSW and ASW modes (diagram 340 presented in FIG. 3(a)), and one for MSW mode (diagram 350 presented in FIG. 3(b)). In these examples, $F_n$ is the preceding input frame and $F_{n+1}$ is the succeeding input frame and each of these frames comprises 4 slices, and 4 threads are used to encode the slices. The box in which the word slice appears in regular font represents an unprocessed slice, a box in which the word slice is underlined represents a processed slice and a box in which the word slice is italicized represents a slice currently being processed. In diagram 340 of FIG. 3(a) Frame $F_n$ comprises slice $S_0$ 341, slice $S_1$ 342, slice $S_2$ 343 and slice $S_3$ 344. Similarly, frame $F_{n+1}$ comprises slice $S_0$ 345, slice $S_1$, 346, slice $S_2$ 347 and slice $S_4$ 348. Diagram 340 displayed in FIG. 3(a) that corresponds to an ASW or SSW ME mode shows a situation where Thread 4 cannot process Slice $S_3$ 348 in frame $F_{n+1}$ because the processing of Slice $S_3$ 344 in frame $F_n$ (the slice at the same physical location as slice $S_3$ 248) is not yet completed. In diagram 350 of FIG. 3(b) that corresponds to the MSW mode, frame $F_n$ comprises slice $S_0$ 351, slice $S_1$, 352, slice $S_2$ 353 and slice $S_3$ 354. Similarly, frame $F_{n+1}$ comprises slice $S_0$ 355, slice $S_1$, 356, slice $S_2$ 357 and slice $S_3$ 358. Diagram 350 in FIG. 3(b) shows a situation where no thread can process a new slice in the succeeding input frame because for none of the slices $S_i$ (i=0 to 3) in frame $F_{n+1}$ the processing of all the reference slices $S_i$, $S_{i+1}$, and $S_{i-1}$ (in frame $F_n$) has been completed.

Figure 4:
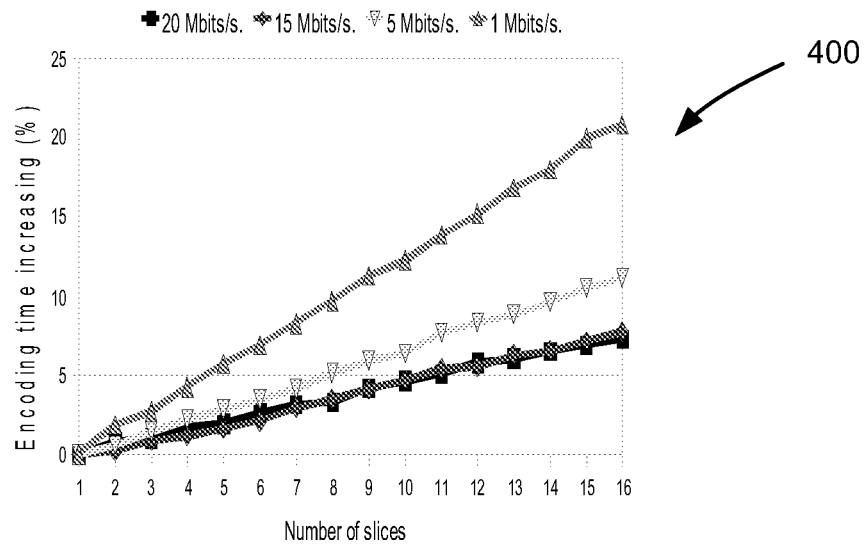
FIG. 4 shows the effect of the number of slices on the encoding time for a sequential (non-parallel) execution on Intel's IPP H.264 video encoder.

To reduce the number of cases that gives rise to an empty slices to process list 112, supplementary slices may be added. The number of supplementary slices is defined as the difference between the number of slices per frame and K, the number of threads used to encode slices. Using more supplementary slices will lead to reducing the number of cases that result in an empty slices to process list 112. However, as mentioned earlier, increasing the number of slices reduces the visual quality of the encoded sequence. Moreover, increasing the number of slices also results in a slight increase in the complexity of encoding: diagram 400 in FIG. 4, for example, shows the impact of the number of slices on the encoding time of a sequential execution on Intel's IPP H.264 video encoder. The various symbols used in identifying the lines in the graph are explained. A square, a diamond, an inverted triangle and triangle correspond to a bit rate of 20 Mbits/s, 15 Mbits/s, 5 Mbits/s and 1 Mbit/s. For each of these bit rates the encoding time is observed to increase slightly with an increase in the number of slices. Therefore, only a sufficient number of slices need to be added to increase speedup, but not too many, in order to preserve a good video quality. Thus, FIG. 4 demonstrates that the encoding time increases substantially linearly with the number of slices.

The system of the embodiments of the invention was implemented based on the H.264 encoder delivered as sample code in the Intel Integrated Performance Primitives (IPP) library, version 6.1.x described in Intel. 2010, *Intel® Integrated Performance Primitives 6.1—Code Samples* available from http://software.intel.com/en-us/articles/intel-integrated-performance-primitives-code-samples/. Intel's H.264 encoder already comprises a slice-level parallelism approach, which will be compared to the method of the embodiments of the current invention.

Simulations were executed on the first 300 frames of five different YUV video sequences (train-station, horse-cab, sunflower, waterskiing and rally) described in Xiph.org. 2011, *Test Media*, available from: http://media.xiph.org/video/derf/. These sequences had a resolution of 1280×720 pixels at 50 frames per second, and were encoded using the following parameters: logarithm ME method, quarter-pixel motion compensation precision, CABAC entropy encoding, a 16×16 pixel ME search window, and constant bit rates (CBR) of 1, 5, 10, 15 and 20 Mbit/s.

Figure 5:
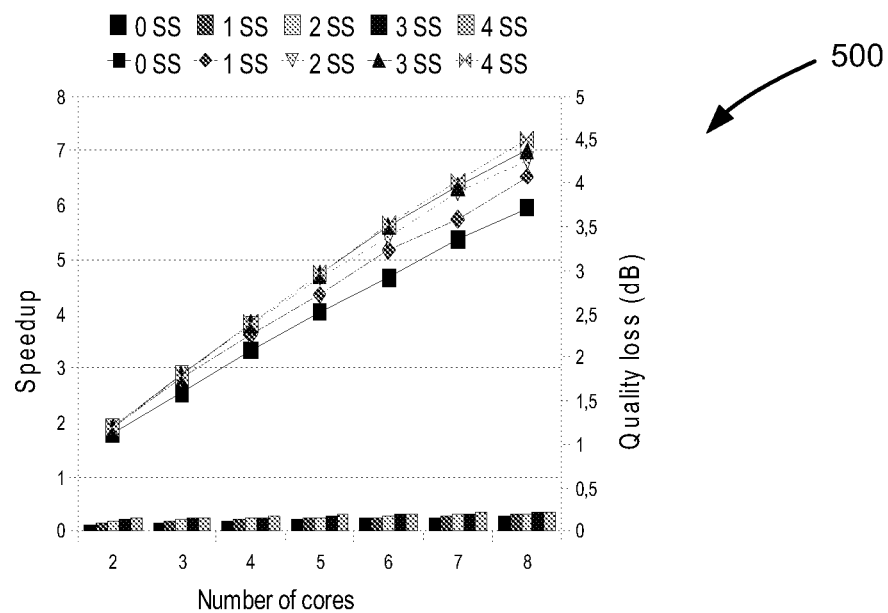
FIG. 5 shows the impact of the number of supplementary slices on the on speedup and quality for the MSW mode.
Figures 6, 7, 8:
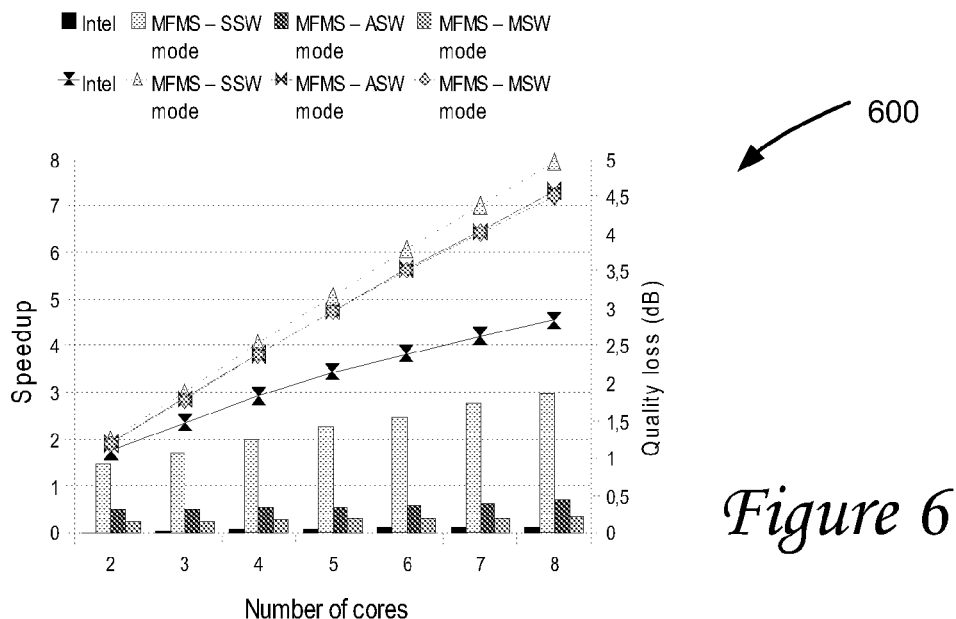
FIG. 6 presents a performance comparison between the three proposed motion estimation modes with 4 supplementary slices and Intel's approach.
FIG. 7 presents Table 700 showing the impact of bit rate on the speed and quality for the MSW and SSW modes.
FIG. 8 presents Table 800 showing the impact of the video sequence on the speed and quality for the MSW and SSW modes for a bit rate of 10 Mbits/sec.

Simulations were performed on an HP Proliant® ML350 G6 system composed of two quad core Xeon® E5530 systems running at 2.4 GHz with Hyper-Threading mode turned off. FIG. 5 and FIG. 6 show the average speedup and quality loss compared to the prior art H.264 sequential execution using a single slice per frame. This average was computed for all the above-mentioned video sequences, for a parallel execution using a number of cores varying between 2 and 8. Quality loss was measured in PSNR on the luminance component.

Diagram 500 in FIG. 5 shows the impact of adding 0, 1, 2, 3 and 4 supplementary slices for various number of cores on the MSW ME mode of the parallel approach used in the embodiments of the invention for a bit rate of 10 Mbit/s. The symbols used for identifying the lines in the line graph appearing in the upper part of diagram 500 are described. A square, a diamond, an inverted triangle, a triangle and a dumbbell correspond to a number of supplementary slices of 0, 1, 2, 3 and 4 respectively. The symbols used for the bars in each group of bars presented in the lower part of diagram 500 are explained. Starting from left, the first bar, the second bar, the third bar, the fourth bar and the fifth bar correspond to a number of supplementary slices of 0, 1, 2, 3 and 4 respectively. One can observe several conclusions from FIG. 5. First, speedup increases with an increase in the number of supplementary slices. Furthermore, the more significant speedup gains are obtained by adding 1 and 2 supplementary slices, respectively after which the system saturates. The observed gains are more significant when the number of cores used is increased. Second, increasing the number of supplementary slices also increases loss of visual quality for the output video. Generally, the applicants noticed that adding a number of supplementary slices equal to half the number of cores used was a good choice. Further experiments led to similar conclusions for the other two modes and for the four others tested bit rates. This leads to configuring the system such that the sum of a number of slices in the preceding input frame and the number of slices in the succeeding input frame is about one and a half times the number of cores or the number of hardware processors.

Diagram 600 in FIG. 6 shows a comparison between the performances of the three proposed ME modes and Intel's multi-slice parallel approach for a bit rate of 10 Mbit/s. The symbols used for identifying the lines in the line graph appearing in the upper part of diagram 600 are described. An hour glass, a triangle, a dumbbell, and a diamond correspond to Intel, MFMS-SSW (a SSW mode), MFMS-ASW (an ASW mode) and the MFMS-MSW (a MSW mode) respectively. The symbols used for the bars in each group of bar graphs presented in the lower part of diagram 600 are explained. Starting from left, the first bar, the second bar, the third bar, the fourth bar and the fifth bar correspond to Intel, MFMS-SSW (a SSW mode), MFMS-ASW (an ASW mode) and the MFMS-MSW (a MSW mode) respectively. For the three proposed ME modes, a number of supplementary slices equal to 4, offering a good trade-off between speed and quality loss for an 8-core parallel execution is selected. For Intel's approach, a number of supplementary slices equal to zero is used. This produces the highest speedup and the lowest quality loss for this approach.

For an 8-core execution, a speedup of 7.95× for SSW mode, the fastest mode, and a speedup of 7.20× for MSW mode, the slowest mode are achieved. Therefore, it has been found that the SSW mode is about 10% faster than the MSW mode. However, the fastest mode yields an average visual quality loss of 1.85 dB, which is high enough to produce a visually perceptible degradation, especially on macroblocks located close to the slice limits, since they use constrained ME. The MSW mode produces a quality loss of about 0.22 dB, a barely perceptible loss of quality. Compared to the MSW mode, the ASW mode produces a negligible speedup gain at the expense of a quality loss about twice as high. This suggests using the MSW mode, except when speedup is critical, in which case, SSW may be more appropriate, but at the cost of a much greater quality loss. These recommendations are also applicable for the four others bit rates used in simulations, since they produce comparable results.

All the modes exceed the speedups achieved by Intel's prior art approach. For example, the SSW mode achieves a speedup of 7.95×; MSW mode, a speedup of 7.20×, and Intel's approach, a speedup of 4.55×, for an 8-core parallel execution. In all cases, the speedup gains are obtained at the cost of increased quality loss, particularly for the SSW mode. However, the MSW mode offers an excellent trade-off between speedup and quality loss. This trade-off is superior to the one offered by Intel's approach as significantly higher speedup without significant quality loss is achieved.

The approach used in the current invention lead to speedups comparable to those obtained by state-of-the-art approaches. Chen et al., and Ge et al., discussed earlier, have tested their parallel approach on a 4-processor multi-processor systems. In the first case, the authors obtain a speedup of 3.80× using CIF sequences, and in the second case, they obtain a speedup of 3.95× using CIF sequences. However, this latter approach requires the use of B frames to achieve such a high speedup. By comparison, the fastest motion estimation mode for this invention, the SSW mode, obtains a speedup of 4.02× on HD sequences with 4 cores. This speedup is slightly greater than the expected theoretical acceleration because the restrictions on the ME window reduces the encoding complexity during a parallel execution.

Table 700 displayed in FIG. 7 presents the impact of bit rate on performance when MSW and SSW modes are applied using 8 cores and 4 supplementary slices (for a total of 12 slices). Table 700 shows that quality loss decreases, while speedup increases, with increasing bit rate. The quality loss with the MSW mode is entirely due to the usage of slices. As shown in Table 700, using 12 slices at 1 Mbit/s produces a quality loss of 0.84 dB (compared to using a single slice as in the sequential execution). With SSW, there is further quality loss due to a restricted motion estimation search window.

Table 800 displayed in FIG. 8 shows the influence of the sequence on performance when the MSW and SSW modes are applied with 8 cores and 4 SS. Speedup and quality decrease on sequences with high vertical motion such as Rally. As observed earlier, SSW can obtain speedups greater than the expected theoretical acceleration because the restrictions on the ME window reduce the encoding complexity during a parallel execution.

The embodiments of the present invention use a novel multi-frame and multi-slice parallel video coding approach conveniently applied to H.264. The method and system of the present invention achieve high speedup, low latency and low video quality loss, without requiring the use of B frames. The approach used in the current invention produces the highest speedups compared to those in the literature that do not require B frames. The speedups achieved by the embodiment of this invention are also comparable to those obtained by the best methods using B frames. Not requiring B frames makes the invention usable in a real-time video transmission context such as video-conferencing.

The embodiments of the present invention can process both P frames as well as I frames, although the invention is most useful for P frames. I frames are encoded independently: their coding is not based or doesn't depend on any previous frame. Therefore an I frame can be coded at any time and multiple successive I frames could even be coded in parallel without any problem. However, since a P frame depends on the previous frame, the encoding of a P frame cannot be performed until certain conditions are met. Even the coding of an I frame followed by a P frame is not a trivial task; not because of the I frame but because of the P frame and its dependencies. The novel method and system of the embodiments of the present invention can effectively solve these problems and efficiently encode both P and I frames.

The high speedups obtained by the embodiment of this invention are obtained from supporting a number slices equal or greater than the number of cores used and due to processing slices in the preceding and the succeeding frames in parallel. The flexibility in the number of slices used in the invention is important because some applications need a high number of slices for different reasons: maximum packet size, error resilience, parallel decoding, etc. Furthermore, the method of the invention can be implemented in an H.264 encoder supporting a multi-slice parallel approach, such as Intel's. The high speedups achieved in the embodiments of the present invention allows the encoding of HD video sequences in real time on recent multi-core systems.

Experiments on 720p sequences (progressive sequences of 1280×720 pixels) show that the proposed approach provides speedups comparable to those obtained by state-of-the-art approaches, but without the disadvantage of requiring bidirectional (B) frames. This is important since B frames are not supported by the H.264 baseline profile, and increase latency. This property makes the current invention usable in a real-time video transmission context like video-conference. The speedups obtained by the embodiments of the invention are a near-linear function of the number of cores used, and are close to the number of cores used. The number of cores is configurable and the current invention's best motion estimation mode preserves the video quality (achieves a quality similar to that of a non-parallel encoder). The slice encoding used in the invention is based on reference slices and not a reference frame. This means that it does not have to wait until the previous frame is fully encoded before starting to encode the frame that follows.

Various changes and modifications of the embodiments shown in the drawings and described in the specification may be made within the scope of the following claims without departing from the scope of the invention in its broader aspect. For example, a system with multiple processors each of which is a multi-core processor can be used. Such a method is expected to lead to an increased speedup in encoding. Multiple input videos can be encoded simultaneously on the system of the embodiments of the invention. Such a method can lead to a more effective utilization of processing elements on a system with a large number of processing elements. The packaging of certain modules within other modules and units can be changed from the ones shown in this document as long as the functionality of these modules is achieved.

Although the embodiments of the invention have been described in detail, it will be apparent to one skilled in the art that variations and modifications to the embodiment may be made within the scope of the following claims.

What is claimed is:

1. A method for encoding frames in a video, comprising: employing at least one hardware processor for: encoding two successive input frames of the video, a preceding input frame and a succeeding input frame, comprising:
   (a1) dividing the preceding input frame into slices, each slice characterizing a spatial region within the preceding input frame;
   (a2) dividing the succeeding input frame into slices, each slice characterizing a spatial region within the succeeding input frame;
   and in parallel:
   (a3) processing one or more slices in the preceding input frame by a multi-core processor;
   (a4) after the processing of one of said one or more slices in the preceding input frame has been completed, processing, by those cores of the multi-core processor that are available for processing, one or more slices in the succeeding input frame having locations corresponding to the one or more slices in the preceding input frame, comprising:
   for a slice of said one or more slices in the succeeding input frame for which a corresponding slice in the preceding input frame has been already processed:
   (i) performing motion estimation using all slices in a motion estimation window for the corresponding slice in the preceding input frame, provided said all slices in the motion estimation window in the preceding input frame have been processed;
   (ii) provided said all slices in the motion estimation window for the corresponding slice in the preceding input frame have not been processed, performing the motion estimation using only those slices in the motion estimation window in the preceding input frame that have been already processed; and
   (iii) provided none of the slices in the motion estimation window in the preceding input frame have been processed except for the corresponding slice, performing the motion estimation using the corresponding slice in the preceding input frame.

2. The method of claim 1, wherein the preceding input frame and the succeeding input frame are intra frames.

3. The method of claim 1, wherein the preceding input frame and the succeeding input frame are predicted frames.

4. The method of claim 1, further comprising performing the step (a4) immediately after the processing of at least one of the slices in the preceding input frame has been completed.

5. The method of claim 1, wherein the step (ii) further comprises performing the motion estimation using:
   the corresponding slice in the preceding input frame; and
   one of the following:
      at least one slice on top or at bottom of the corresponding slice in the preceding input frame;
      both a slice on top and a slice at bottom of the corresponding slice in the preceding input frame;
      more than one slice above the corresponding slice in the preceding input frame;
      more than one slice below the corresponding slice in the preceding input frame.

6. The method of claim 1, further comprising:
for each input frame, generating a corresponding output frame comprising processed slices; and
writing the output frames in an output video.

7. The method of claim 1, wherein a sum of a number of slices in the preceding input frame and a number of slices in the succeeding input frame is equal to or greater than a number of cores in the multi-core processor.

8. The method of claim 1, wherein:
the step (a3) further comprises performing a pre-slice encoding of the preceding input frame before processing said one or more slices in the preceding input frame, comprising writing a frame type and a frame header into a respective output frame;
the step (a4) further comprises performing a pre-slice encoding of the succeeding input frame before processing the slice in the succeeding input frame, comprising writing a frame type and a frame header into a respective output frame; and
the pre-slice encoding of the succeeding input frame being performed after the pre-slice encoding of the preceding input frame is completed.

9. The method of claim 1, wherein:
the step (a3) further comprises performing a post-slice encoding of the preceding input frame after processing all slices in the preceding input frame, comprising applying a deblocking filter for smoothing sharp edges formed between macroblocks of the preceding input frame;
the step (a4) further comprises performing a post-slice encoding of the succeeding input frame after processing all slices in the succeeding input frame, comprising applying a deblocking filter for smoothing sharp edges formed between macroblocks of the succeeding input frame; and
the post-slice encoding of the succeeding input frame being performed after the post-slice encoding of the preceding input frame is completed.

10. The method of claim 1, wherein a sum of a number of slices in the preceding input frame and a number of slices in the succeeding input frame is about one and a half times a number of cores in the multi-core processor.

11. The method of claim 1, wherein:
the step (a3) further comprises performing quantization for the preceding input frame producing a quantization parameter; and
the step (a4) further comprises performing quantization for the succeeding input frame by using the quantization parameter.

12. The method of claim 6, wherein the output video is in a H.264 format.

13. A non-transitory computer readable storage medium, having a computer readable program code instructions stored thereon for execution by a hardware processor, causing the hardware processor to: encode two successive input frames of the video, a preceding input frame and a succeeding input frame, comprising:
(a1) dividing the preceding input frame into slices, each slice characterizing a spatial region within the preceding input frame;
(a2) dividing the succeeding input frame into slices, each slice characterizing a spatial region within the succeeding input frame;
and in parallel:
(a3) processing one or more slices in the preceding input frame by a multi-core processor; and after the processing of one of the one or more slices in the preceding input frame has been completed:
(a4) processing, by those cores of the multi-core processor that are available for processing, one or more slices in the succeeding input frame having locations corresponding to the one or more slices in the preceding input frame, comprising:
for a slice of said one or more slices in the succeeding input frame for which a corresponding slice in the preceding input frame has been already processed:
(i) performing motion estimation using all slices in a motion estimation window for the corresponding slice in the preceding input frame, provided said all slices in the motion estimation window in the preceding input frame have been processed;
(ii) provided said all slices in the motion estimation window for the corresponding slice in the preceding input frame have not been processed, performing the motion estimation using only those slices in the motion estimation window in the preceding input frame that have been already processed; and
(iii) provided none of the slices in the motion estimation window in the preceding input frame have been processed except for the corresponding slice, performing the motion estimation using the corresponding slice in the preceding input frame.

14. A computerized system for encoding frames in a video comprising:
a hardware processor, and a non-transitory computer readable storage medium having computer readable instructions stored thereon for execution by the processor, causing the hardware processor to: encode two successive input frames of the video, a preceding input frame and a succeeding input frame, comprising:
(a1) dividing the preceding input frame into slices characterizing respective spatial regions within the preceding input frame, and the succeeding input frame into slices characterizing respective spatial regions within the succeeding input frame; in parallel:
(a2) processing one or more slices in the preceding input frame by a multi-core processor; and after the processing of one of the one or more slices in the preceding input frame has been completed:
(a3) processing, by those cores of the multi-core processor that are available for processing, one or more slices in the succeeding input frame having locations corresponding to the one or more slices in the preceding input frame, comprising: for a slice of said one or more slices in the succeeding input frame for which a corresponding slice in the preceding input frame has been already processed:
(i) performing motion estimation using all slices in a motion estimation window for the corresponding slice in the preceding input frame, provided said all slices in the motion estimation window in the preceding input frame have been processed;
(ii) provided said all slices in the motion estimation window for the corresponding slice in the preceding input frame have not been processed, performing the motion estimation using only those slices in the motion estimation window in the preceding input frame that have been already processed; and
(iii) provided none of the slices in the motion estimation window in the preceding input frame have been processed except for the corresponding slice, performing the motion estimation using the corresponding slice in the preceding input frame.

15. The system of claim 14, wherein the preceding input frame and the succeeding input frame are intra frames.

16. The system of claim 14, wherein the preceding input frame and the succeeding input frame are predicted frames.

17. The system of claim 14, wherein the computer readable instructions further cause the processor to perform the processing of a slice in the succeeding input frame immediately after the processing of at least one of the one or more slices in the preceding input frame has been completed.

18. The system of claim 14, wherein the computer readable instructions further cause the processor to perform the motion estimation using:
   the corresponding slice in the preceding input frame; and
   one of the following:
      at least one slice on top or at bottom of the corresponding slice in the preceding input frame;
      both a slice on top and a slice at bottom of the corresponding slice in the preceding input frame;
      more than one slice above the corresponding slice in the preceding input frame;
      more than one slice below the corresponding slice in the preceding input frame.

19. The system of claim 14, wherein the computer readable instructions further cause the processor to generate:
   for each input frame, a corresponding output frame comprising processed slices; and
   a writer module writing the output frames in an output video.

20. The system of claim 14, wherein a sum of a number of slices in the preceding input frame and a number of slices in the succeeding input frame is equal to or greater than a number cores in the multi-core processor.

21. The system of claim 14, wherein the computer readable instructions further cause the processor to:
   perform a pre-slice encoding of the preceding input frame before processing said one or more slices in the preceding input frame, comprising writing a frame type and a frame header into a respective output frame; and
   perform a pre-slice encoding of the succeeding input frame before processing the slice in the succeeding input frame, comprising writing a frame type and a frame header into a respective output frame;
   wherein the pre-slice encoding of the succeeding input frame is performed after the pre-slice encoding of the preceding input frame is completed.

22. The system of claim 14, wherein the computer readable instructions further cause the processor to:
   perform a post-slice encoding of the preceding input frame after processing all slices in the preceding input frame, comprising applying a deblocking filter for smoothing sharp edges formed between macroblocks of the preceding input frame; and
   perform a post-slice encoding of the succeeding input frame after processing all slices in the succeeding input frame, comprising applying a deblocking filter for smoothing sharp edges formed between macroblocks of the succeeding input frame;
   wherein the post-slice encoding of the succeeding input frame is performed after the post-slice encoding of the preceding input frame is completed.

23. The system of claim 14, wherein a sum of a number of slices in the preceding input frame and a number of slices in the succeeding input frame is about one and a half times a number of cores in the multi-core processor.

24. The system of claim 14, wherein the computer readable instructions further cause the processor to:
   perform quantization for the preceding input frame to produce a quantization parameter; and
   perform quantization for the succeeding input frame by using the quantization parameter.

25. The system of claim 19, wherein the output video is in a H.264 format.

* * * * *